Dec. 14, 1954     A. A. HAUSER ET AL     2,696,947
GUN DIRECTING SYSTEM
Filed Aug. 28, 1943     7 Sheets-Sheet 1

INVENTORS
A. A. HAUSER
E. J. NAGY
G. E. WHITE
H. HARRIS, JR.
BY
THEIR ATTORNEY

Dec. 14, 1954    A. A. HAUSER ET AL    2,696,947
GUN DIRECTING SYSTEM
Filed Aug. 28, 1943    7 Sheets-Sheet 2

INVENTORS
A. A. HAUSER
E. J. NAGY
G. E. WHITE
H. HARRIS, JR.
BY
THEIR ATTORNEY

Dec. 14, 1954  A. A. HAUSER ET AL  2,696,947
GUN DIRECTING SYSTEM
Filed Aug. 28, 1943  7 Sheets-Sheet 3

INVENTORS
A. A. HAUSER
E. J. NAGY
G. E. WHITE
H. HARRIS JR.
BY
THEIR ATTORNEY

Dec. 14, 1954  A. A. HAUSER ET AL  2,696,947
GUN DIRECTING SYSTEM
Filed Aug. 28, 1943  7 Sheets-Sheet 5

To $t_p$ multipliers
in prediction circuit 61

INVENTORS
A. A. HAUSER
E. J. NAGY
G. E. WHITE
H. HARRIS JR.
BY
THEIR ATTORNEY

Dec. 14, 1954  A. A. HAUSER ET AL  2,696,947
GUN DIRECTING SYSTEM
Filed Aug. 28, 1943  7 Sheets-Sheet 6

INVENTORS
A. A. HAUSER
E. J. NAGY
G. E. WHITE
H. HARRIS JR.

BY
THEIR ATTORNEY.

INVENTORS
A. A. HAUSER
E. J. NAGY
G. E. WHITE
H. HARRIS JR.
BY
THEIR ATTORNEY

United States Patent Office 2,696,947
Patented Dec. 14, 1954

2,696,947

GUN DIRECTING SYSTEM

Arthur A. Hauser and Edward J. Nagy, Garden City, Gifford E. White, Hempstead, and Herbert Harris, Jr., Cedarhurst, N. Y., assignors to The Sperry Corporation, a corporation of Delaware Application August 28, 1943, Serial No. 500,348

17 Claims. (Cl. 235—61.5)

This invention relates generally to the art of gun fire control, and more particularly to means for and methods of continuously directing gun fire so as to effect hits against rapidly moving targets, such as airplanes. Although primarily intended as an anti-aircraft director, the apparatus of the present invention will obviously function equally well to solve the more simple fire control problems, such as directing fire against surface craft, stationary targets, and so forth. An identical fire control director is disclosed in copending application Serial No. 500,349 for Gun Directing System, filed August 28, 1943, in the names of David J. Campbell, Selden P. McCabe, and Herbert Harris, Jr., now Patent No. 2,660,371.

Prior gun directors, such as those described in U. S. Patent No. 2,065,303 entitled "Apparatus for the Control of Gun Fire," issued December 22, 1936, in the names of E. W. Chafee et al., and in copending U. S. application, Serial No. 470,686, for "Gun Directing System," filed December 30, 1942, in the names of D. J. Campbell and W. G. Wing, now Patent No. 2,492,355, include predicting apparatus which is based upon the assumption that the target flies at a constant speed in a constant direction during the projectile time of flight. While this assumption is very often valid, for example, during the bombing run of a bomber aircraft, it is obviously desirable to be able to fire effectively at targets flying in a curved path. The present director includes apparatus for continuously indicating the actual course the target is flying. From this course indication it is possible to tell whether the straight line flight assumption is or is not valid. Auxiliary predicting apparatus is provided in the present director, which may be rendered effective when the course indicator indicates that the target is flying in a curved path, and which then operates to introduce a correction to compensate for the target's deviation from straight line flight.

The present invention also comprehends novel regenerative tracking apparatus which may be used in conjunction with either the radio automatic or optical manual tracking systems provided. This regenerative tracking apparatus is designed automatically to continue to track with a target over some period of time if for some reason either radio or visual contact with the target is interrupted. The regenerative tracking apparatus disclosed herein is further described and claimed in copending application Serial No. 658,164, filed March 29, 1946, to Herbert Harris, Jr. for "Regenerative Tracking System," which application is assigned to the same assignee as the present invention. The task of the radio automatic or optical manual tracking systems is thus reduced to that of compensating for changes in target course or speed.

An improved predicting circuit for solving for the future position of a target flying a straight line course is provided. This circuit is similar to that employed for a similar purpose in copending application, Serial No. 470,686, but improved means are provided for controlling the sensitivity of the circuit during operation. The linear target rates computed in this predicting circuit are compensated in a novel manner to take into account the effect of wind upon the projectile.

Novel and improved ballistic apparatus is also disclosed for computing the coordinates of the shell-burst position which correspond to the values of angle of train, quadrant elevation, and time of flight represented by three corresponding shaft displacements in the director. A novel mechanical multiplying unit having a linear output characteristic is provided for performing certain of the multiplications required in the ballistic apparatus. However, any suitable linkage multiplying device may be used for this purpose.

An important feature of the invention is the provision of means for converting the rectangular coordinate error signals, representing the respective differences between the rectangular coordinates of the computed future position of the target and the corresponding rectangular coordinates of the shell-burst position, into corresponding error signals representing the amounts the quadrant elevation, angle of train and time of flight shafts are in error. These signals are then used directly to actuate the servos controlling the position of these shafts, thereby providing a proportionate type of control having a high degree of accuracy and very little tendency to hunt. This feature is claimed in the above-mentioned copending application S. N. 500,349, now Patent No. 2,660,371.

In prior gun directors a correction for fuze dead time was computed upon the assumption that the rate of change of fuze data is constant during the dead time interval. In the present invention, the fact that under ordinary circumstances the fuze data will vary in a substantially parabolic fashion with respect to time is recognized, and a fuze dead time correction is computed on that basis.

Accordingly, the principal object of the present invention is to provide improved apparatus and methods for directing gun fire against a target.

Another object of the invention is to provide predicting apparatus adapted to compute the true future position of a target flying in a circular path.

Still another object is to provide a novel smoothing and differentiating circuit especially adapted to have its dynamic characteristics changed during operation.

A further object of the invention is to provide regenerative tracking means for a gun director.

A still further object is to provide an indication of the direction of flight of a target.

An object of the invention is to provide novel and improved ballistic mechanism for use in a gun director.

Another object is to provide an error conversion mechanism for converting errors in rectangular coordinates to corresponding errors in quadrant elevation, angle of train and time of flight.

Still another object of the invention is to provide improved apparatus for correcting fuze data for fuze dead time.

A further object is to provide a mechanical calculator adapted to produce an output displacement equal to the product of its two input displacements.

Other objects and advantages will become apparent from the specification, taken in connection with the accompanying drawings, wherein the invention is embodied in concrete form.

In the drawings.

Similar characters of reference are used in all of the above figures to indicate corresponding parts. Arrows are employed to indicate the direction of flow of information or control influences.

Throughout the director of the present invention data is represented and transmitted by mechanical displacements, and direct and alternating potentials. It will be understood, where not stated, that a mechanical displacement so employed is proportional in magnitude to the magnitude of the quantity represented thereby, and corresponds in direction to the algebraic sign of the quantity represented. Similarly the magnitude of the direct or alternating potential is proportional to the magnitude of the quantity represented thereby, and the polarity or phase of the potential corresponds to the sign of the quantity.

Figure 1:
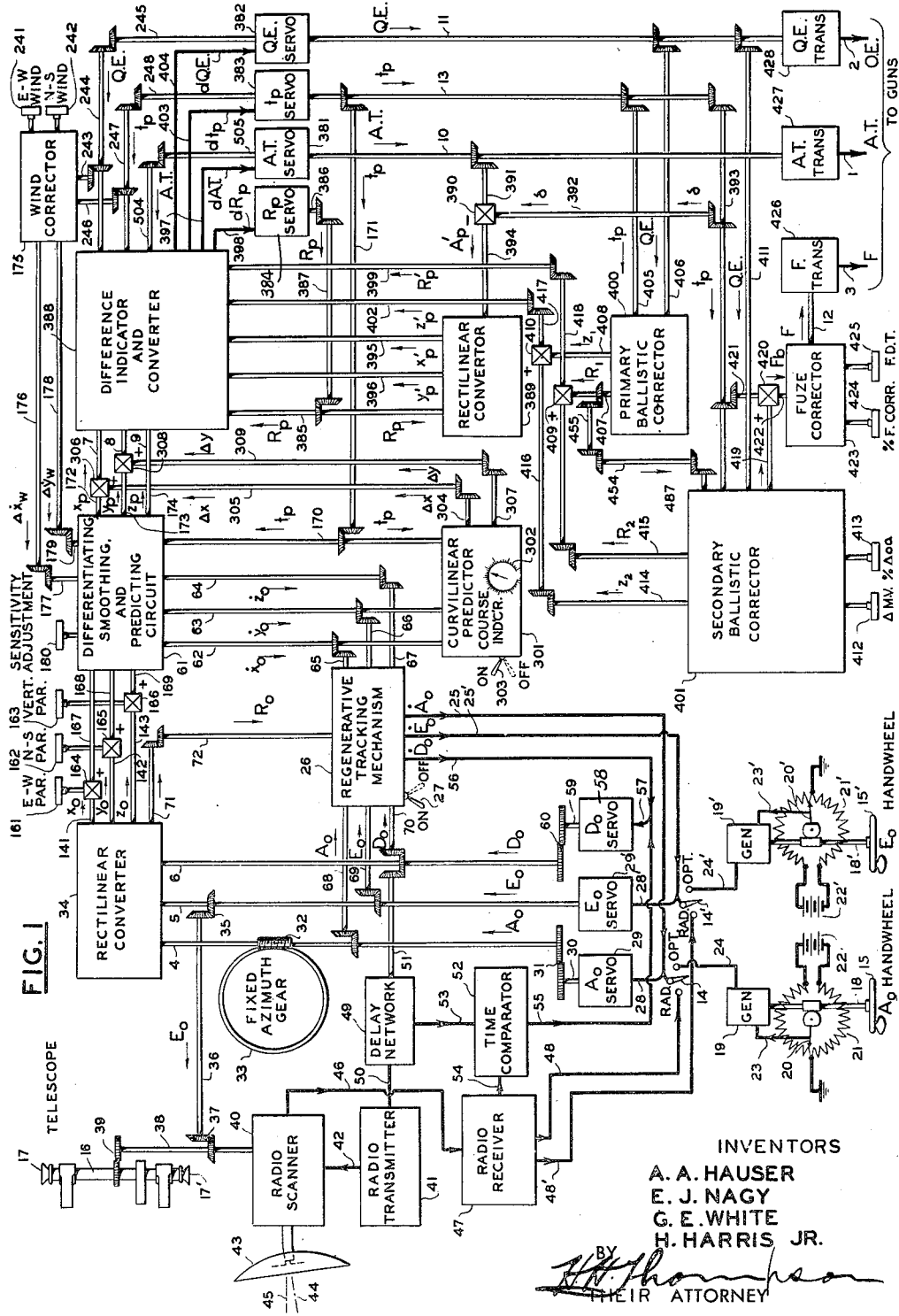
Fig. 1 is a schematic diagram of the whole gun directing apparatus of the present invention.

In Fig. 1 there is shown a schematic diagram of the whole gun directing system of the present invention, the ultimate purpose of which is to electrically transmit angle of train (A. T.), quadrant elevation (Q. E.) and fuze setting (F) data to the guns, as on output leads 1, 2 and 3, respectively. For the sake of clarity in the description, and simplicity in the explanation, the apparatus of Fig. 1 may be considered to accomplish its purpose in the following three distinct and more or less independent steps:

1. Range finding and tracking apparatus is employed to obtain continuous spherical coordinate data representative of the present position of the target, that is, present azimuth ($A_0$), present elevation ($E_0$) and present slant range ($D_0$), obtained as proportional angular displacements of present position shafts, 4, 5 and 6, respectively.

2. This present position spherical coordinate data is converted to corresponding present position rectangular coordinate data ($x_0$, $y_0$, and $z_0$) and is combined with the projectile time of flight ($t_p$) in suitable prediction apparatus to obtain the rectangular coordinates ($x_p$, $y_p$, and $z_p$) of the predicted, or future, position of the target, that is, the point in space at which the target will be located at a time ($t_p$) later. This predicted position data is obtained as proportional angular displacements of future position shafts 7, 8 and 9, respectively.

3. This predicted position data is employed in suitable ballistic mechanism to obtain angle of train (A. T.) and quadrant elevation (Q. E.) data for positioning the guns, fuze (F) data for cutting the projectile and time of flight ($t_p$) data for use in the prediction apparatus. The angle of train, quadrant elevation, fuze, and time of flight data are obtained as proportional angular displacements of shafts 10, 11, 12 and 13, respectively.

The first problem, namely that of angularly displacing shafts 4, 5 and 6, respectively, in proportion to present azimuth ($A_0$), present elevation ($E_0$), and present slant range ($D_0$), will now be considered. In tracking the target in order to obtain azimuth and elevation data two modes of operation are provided: 1, radio automatic, and 2, optical manual. The desired one of these modes of operation may be selected by suitably positioning selector switches 14 and 14' which, it will be understood, are simultaneously operated as a unit. In both radio and optical modes of operation range data is automatically supplied from the radio sighting apparatus.

When switches 14, 14' are in their optical position an azimuth and an elevation operator actuate handwheels 15, 15', respectively, until the line of sight defined by the telescope 16 is directed toward the target. Two eyepieces 17, 17' are provided on telescope 16, one for each operator, through which they can see the target and thus determine whether the telescope has been properly oriented.

Handwheel 15 actuates a shaft 18 which in turn drives a permanent magnet generator 19, and also drives the rotating contact arm 20 of a linearly wound potentiometer 21, the opposite terminals of which are connected to a suitable constant source of direct voltage, indicated as battery 22, and the intermediate terminal of which is connected to ground, as shown. Accordingly, there will be provided on lead 23, which is electrically connected to contact arm 20, a direct voltage proportional in magnitude and corresponding in polarity to the angular displacement of handwheel 15 from a datum position. This voltage signal is placed in series with the output voltage of generator 19 which last voltage, as is well known, will be proportional in magnitude, and will correspond in polarity, to the rate at which handwheel 15 is being displaced. Accordingly, the voltage appearing on lead 24 will be the algebraic sum of two component voltages, one proportional to the displacement of handwheel 15 and the other proportional to the rate of said displacement.

The voltage on lead 24 is transmitted through switch 14 and is then added to, by being placed in series with, the voltage appearing on output lead 25 of the regenerative tracking mechanism 26. For the present it will be assumed that the regenerative tracking mechanism is not operating (switch 27 is in the off position), and that therefore no additional voltage is added from the regenerative tracking mechanism. Accordingly, the voltage on lead 28 is identical with that on lead 24.

The voltage on lead 28 is introduced into the azimuth servo 29 which may be of any suitable type of servo unit adapted to produce an angular displacement of its output shaft 30 at a rate proportional in magnitude and corresponding in direction to the magnitude and polarity of its input signal. Output shaft 30 actuates the present azimuth shaft 4 through gearing 31.

Rotated by shaft 4 is a worm 32 engaging the large azimuth gear 33 which is fixedly mounted in the director support. Thus, the existence of a voltage signal on lead 28 will cause worm 32, shaft 4, and all of the rest of the director apparatus to walk around fixed gear 33 at a rate proportional to the voltage on lead 28. Accordingly, since the azimuth operator has control of the voltage on lead 28 through his handwheel 15, he has complete control over the azimuth position of the director, and he may therefore continuously maintain telescope 16 directed at the target in azimuth. When this has been accomplished the angular displacement of shaft 4 is proportional to the present target azimuth angle ($A_0$). Present azimuth data is then introduced into the rectilinear converter 34 as the displacement of shaft 4.

The purpose of the generator 19 is to provide what is commonly termed "aided" tracking in order to facilitate the operator's task of maintaining telescope 16 directed toward the target. If generator 19 were not provided, it will be apparent that pure "rate" tracking would be obtained since the director and telescope 16 would then rotate at a rate proportional to the displacement of handwheel 15. By providing the generator, however, this rate is increased or decreased by a component proportional to the rate of handwheel displacement. The time integral of the increment will be proportional to the time integral of the rate of displacement of the handwheel. The displacement of the director due to this increment will therefore be proportional to the displacement of the handwheel. Thus, it is seen that if the generator alone were employed without the potentiometer 21, pure "displacement" tracking would be obtained wherein the actual displacement of the director would be proportional to the actual displacement of the handwheel. By employing both the generator and the potentiometer "aided" tracking is obtained wherein the director is displaced simultaneously at a rate and by an amount proportional to the displacement of the handwheel.

The apparatus provided for manually tracking the target in elevation is identical with that just described for the azimuth control. Corresponding portions of the tracking apparatus for elevation and azimuth have been given identical reference numbers but are primed in the case of the elevation control equipment.

In the case of elevation control, however, the present elevation shaft 5, driven from the elevation servo 29', rotates the line of sight defined by telescope 16 in a vertical plane through gearing 35, shaft 36, gearing 37, shaft 38 and gearing 39. Shaft 38 is connected to the radio scanner 40 of the radio sighting system to simultaneously rotate the line of sight thereof in elevation.

As in the case of the azimuth control, the elevation operator has complete control, through his handwheel 15', of the voltage appearing on lead 28', and therefore has complete control of the position of shaft 5 and of the orientation in elevation of the line of sight defined by the telescope 16 and the radio sighting system. Present elevation ($E_0$) is also introduced into the rectilinear converter 34 as a proportional rotation of present elevation shaft 5.

For radio automatic tracking, which is initiated by placing switches 14, 14' in their radio position, there is provided a radio sighting system which is preferably of the ultra high frequency pulse type described in copending U. S. application Serial No. 441,188 for "Radio Gun Control System," filed April 30, 1942, in the names of C. G. Holschuh et al., now Patent No. 2,617,982. As more completely described in that application, a radio transmitter 41 includes means for generating short periodic pulses of ultra high frequency radio energy. These pulses of radio energy are transmitted to a radio scanner 40 through a suitable transmission channel for high frequency energy, such as a wave guide, indicated schematically as lead 42.

Rotatably mounted on the radio scanner is a parabolic reflector 43, which is adapted to transmit into space in a fan-shaped beam along its axis 44 the pulses of electromagnetic energy received by scanner 40. Radio scanner 40 includes a motor adapted to rotate reflector 43 about a spin axis 45. As shown, the axis 44 of the parabolic reflector is slightly offset from spin axis 45 so that, as a result of its rotation, a conical portion of space is irradiated with short pulses of electromagnetic energy. The rate of rotation of reflector 43 about spin axis 45 may be of the order of 200 times less than the pulse repetition rate, so that all portions of the conical angle of space are irradiated.

Also included within the radio scanner 40 and rotated by the previously mentioned motor is a two-phase generator which generates two 90° phase displaced voltages and transmits these voltages, as on lead 46, to the radio receiver 47 to provide a time reference of the rotation of reflector 43.

As more fully explained in the above-mentioned copending application, should a target lie within the conical portion of space irradiated by parabola 43, a portion of the electromagnetic energy striking the target will be reflected back to the reflector 43 and received in the form of pulses corresponding to the transmitted pulses but delayed in time by an amount proportional to the distance to the target. These reflected pulses of electromagnetic energy are schematically indicated as being transmitted to the radio receiver 47, as by lead 46, along with the time reference voltages. Should the target be lying along the spin axis 45, which is the line of sight defined by the radio system, it will be apparent that all the reflected pulses will be of the same intensity. On the other hand, if the target should not lie along spin axis 45, the intensity of the reflected pulses will vary substantially sinusoidally as the parabola 43 rotates, the maximum intensity occurring at the time that axis 44 most nearly coincides with the target orientation.

The radio receiver 47 includes detecting means for isolating a sinusoidal voltage corresponding to the substantially sinusoidal variation in intensity of the reflected pulses. Also included within radio receiver 47 are two phase sensitive amplifiers, one for azimuth and one for elevation. By comparing the phase and magnitude of the isolated sinusoidal voltage with one of the time reference voltages in the azimuth phase sensitive detector, there is produced upon output lead 48 a direct voltage corresponding in magnitude and polarity to the azimuth component of the angular deviation between the target orientation and spin axis 45. Similarly, by comparing the phase and magnitude of the isolated sinusoidal voltage with the other time reference voltage in the elevation phase sensitive detector, there is produced upon output lead 48' a direct voltage corresponding in magnitude and polarity to the elevation component of the angular deviation between the target orientation and spin axis 45. These voltages, appearing on leads 48 and 48', can thus be thought of as azimuth and elevation error voltages, respectively, and as providing an electrical indication of the angular error between the line of sight defined by the radio sighting system (spin axis 45) and the target orientation.

As shown, in the radio positions of switches 14, 14' these error voltages are introduced into the azimuth and elevation servos 29, 29' to thereby cause rotations of the present azimuth shaft 4 and the present elevation shaft 5. Rotations of these shafts in turn cause the line of sight defined by the radio system to be moved in azimuth and elevation in a direction such as to align itself with the target orientation and thereby reduce the error voltage signals appearing on leads 48, 48' to zero. In this manner the line of sight 45 of the radio sighting system is continuously and automatically maintained coincident with the target orientation, and present azimuth and present elevation data are continuously introduced into rectilinear converter 34 as proportional angular displacements of shafts 4 and 5.

It will be understood that telescope 16 and radio scanner 40 are mounted on the director such that the lines of sight defined by each are at all times coincident.

Slant range ($D_0$) data is automatically and continuously obtained by the radio sighting system in both the radio and optical positions of switches 14, 14'. For this purpose a delay network 49 is provided which receives on lead 50, from the radio transmitter 41, voltage pulses corresponding in time phase to that of the transmitted radio pulses. Delay network 49 operates to delay these voltage pulses by a time proportional to the angular displacement of slant range shaft 6, which is received on shaft 51. The resulting delayed pulses are then transmitted to a time comparator 52 as on lead 53. Also received by the time comparator are voltage pulses corresponding in time phase to that of the reflected pulses, as on lead 54. The time comparator is adapted to make a time comparison between the phase of the reflected pulses received on lead 54 and the delayed transmitted pulses received on lead 53. If these pulses should be absolutely in phase, then the transmitted pulses received on lead 50 must have been delayed by an amount exactly proportional to the range of the target. Accordingly, when this condition is met, the angular position of shaft 6 represents the true present slant range to the target.

If the reflected pulses received on lead 54 by the time comparator should not be in phase with the delayed transmitted pulses received on lead 53, the time comparator is adapted to produce on output lead 55 a direct voltage corresponding in magnitude and polarity to the difference in phase existing between these two pulses. This output voltage on lead 55, which may be considered as a range error signal, is placed in series with the output voltage appearing on lead 56 from the regenerative tracking mechanism 26, and is then introduced into the slant range servo 58 as on lead 57, as in the case of elevation and azimuth control. It will be assumed for the time being that the regenerative tracking mechanism 26 contributes no additional voltage on lead 56, and that therefore the voltage received by the slant range servo on lead 57 is the same as that appearing on lead 55.

This voltage input to the slant range servo 58 causes the servo to rotate its output shaft 59 at a rate proportional to the input signal. Shaft 59 actuates the present slant range shaft 6 through gearing 60 in such a direction as to cause shaft 51 to increase or decrease the amount of delay introduced in the delay network 49 as required in order to make the delayed pulses appearing on lead 53 coincide in time phase with the reflected pulses appearing on lead 54. As previously pointed out, when this condition of coincidence in time phase with respect to the voltages appearing on leads 53 and 54 has been obtained, the angular displacement of shaft 6 is proportional to the slant range to the target. This slant range data, appearing on shaft 6, is then also introduced into the rectilinear converter 34.

Because of the intrinsic difference between the rectangular coordinate system and the spherical coordinate system, if the target is flying at a constant speed in a constant direction, the linear target rates will remain constant, whereas, the spherical coordinate rates will be constantly changing. Also, the three component linear target rates ($\dot{x}_0$, $\dot{y}_0$ and $\dot{z}_0$) are sufficient to definitely define the target course and speed, whereas, in order to definitely define target course and speed in spherical coordinates not only is it necessary to know the rates of change ($\dot{A}_0$, $\dot{E}_0$ and $\dot{D}_0$) of the spherical coordinates, but also the spherical coordinates ($A_0$, $E_0$ and $D_0$) themselves must be known. It follows that if the target course and speed are known in terms of the rectangular coordinate rates ($\dot{x}_0$, $\dot{y}_0$ and $\dot{z}_0$), and the present position of the target is known in terms of the spherical coordinates ($A_0$, $E_0$ and $D_0$), then the spherical coordinate rates ($\dot{A}_0$, $\dot{E}_0$ and $\dot{D}_0$), are definitely defined and can be determined by simple trigonometry. The relationship works out as follows:

$$(1) \quad \dot{A}_0 = \frac{\dot{y}_0 \cos A_0 - \dot{x}_0 \sin A_0}{R_0}$$

$$(2) \quad \dot{E}_0 = \frac{\dot{z}_0 \cos E_0 - \dot{R}_0 \sin E_0}{D_0}$$

$$(3) \quad \dot{D}_0 = \dot{R}_0 \cos E_0 + \dot{z}_0 \sin E_0$$

$$(4) \quad \dot{R}_0 = \dot{x}_0 \cos A_0 + \dot{y}_0 \sin A_0$$

where $R_0$ represents the present horizontal target range, and $\dot{R}_0$ represents the present horizontal target range rate. $R_0$, which is equal to $D_0 \cos E_0$, and $\dot{R}_0$, which is equal to $\dot{D}_0 \cos E_0$, are introduced into the formulae in order to simplify the actual mechanical solution of the equations, as will later be apparent.

Figure 5:
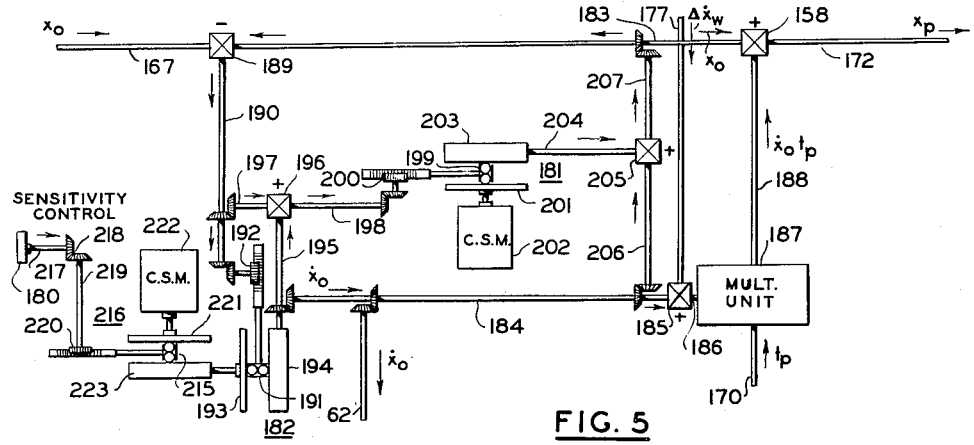
Fig. 5 is a detailed drawing of the smoothing, differentiating, and predicting circuit of Fig. 1.

As will be further described in detail with respect to Fig. 5, these component target rates ($\dot{x}_0$, $\dot{y}_0$, and $\dot{z}_0$) are computed in the differentiating, smoothing and predicting circuit 61 and are produced as proportional angular displacements of output shafts 62, 63, and 64, respectively. Shafts 62, 63 and 64 actuate shafts 65, 66 and 67 through bevel gearing to introduce these component target rates into the regenerative tracking mechanism 26. The spherical coordinates $A_0$, $E_0$ and $D_0$ of the present target position are also introduced into the regenerative tracking mechanism from shafts 4, 5, and 6 by way of shafts 68, 69 and 70, respectively. Present horizontal range ($R_0$), which is equal to $D_0 \cos E_0$, is computed in rectilinear converter 34 and is transmitted to the regenerative tracking mechanism as a proportional angular displacement of shafts 71 and 72.

Having received $A_0$, $E_0$, $D_0$, $R_0$, $\dot{x}_0$, $\dot{y}_0$ and $\dot{z}_0$ as input data, the regenerative tracking mechanism, as will be described in detail hereinafter, is adapted to solve Equations 1 to 4 and, when switch 27 is in the "on" position, to produce on output leads 25, 25' and 56 voltage signals which are proportional to the instantaneous spherical coordinate target rates $\dot{A}_0$, $\dot{E}_0$ and $\dot{D}_0$ respectively. These output voltage signals are placed in series with the error voltages received from the radio automatic or optical manual tracking apparatus, and the resulting voltage is applied as the input signal to the azimuth, elevation and slant range servos to rotate the present position azimuth, elevation, and slant range shafts at proportional rates.

Thus, if it be assumed that the target is flying in a constant direction at a constant speed, and that the target is being correctly tracked at the director so that the spherical coordinate present position data and the computed rectangular coordinate rate data fed to the regenerative tracking mechanism are all correct, then the spherical coordinate rate voltage signals, which the regenerative tracking mechanism computes on leads 25, 25' and 56, will be of the proper magnitude in themselves to cause the director to properly track the target thereafter. Thus, once regenerative tracking has been established, no voltage signal need be supplied by the radio or optical tracking mechanism, as long as the target maintains a constant course and speed. Should the target change its course or speed, the voltage signals supplied to the servos from the regenerative tracking mechanism will no longer be such as to cause the director to properly track the target, and the radio or optical tracking apparatus will then have to supply compensating component voltage signals to the servos in order to re-establish correct tracking. When correct tracking has thus been established, the regenerative tracking mechanism will again take over and supply the proper signals to the servos provided the target maintains its new course and speed.

In the above discussion it was pointed out that correct tracking had to be once initially established before the regenerative tracking mechanism could compute the proper voltage signals to continue the correct tracking. In initially getting on the target, it will be seen that no matter how erroneous are the voltage signals that are initially produced by the regenerative tracking mechanism, the radio automatic or manual optical tracking apparatus can completely override these erroneous signals, and can initially get on the target and establish correct tracking by providing error voltage signals which, when added to the erroneous voltage signals from the regenerative tracking mechanism, produce the resultant servo voltage signals which will produce whatever tracking rates are necessary. Thus, the radio automatic or optical manual tracking system, depending upon the position of switches 14, 14', are always in complete control regardless of the regenerative tracking mechanism.

Accordingly, during the process of getting on the target, the regenerative tracking mechanism and either the radio or optical tracking systems each supply one component of the servo signals. As the tracking process continues, that component supplied by the regenerative mechanism gradually approaches the correct value and that component supplied by the radio or optical system is gradually reduced, until finally the former component reaches the correct value and the latter component is zero. As previously stated, the regenerative tracking mechanism will continue thereafter to automatically maintain correct tracking without further signals from the radio or optical systems as long as the target maintains a constant course and speed.

Figure 2:
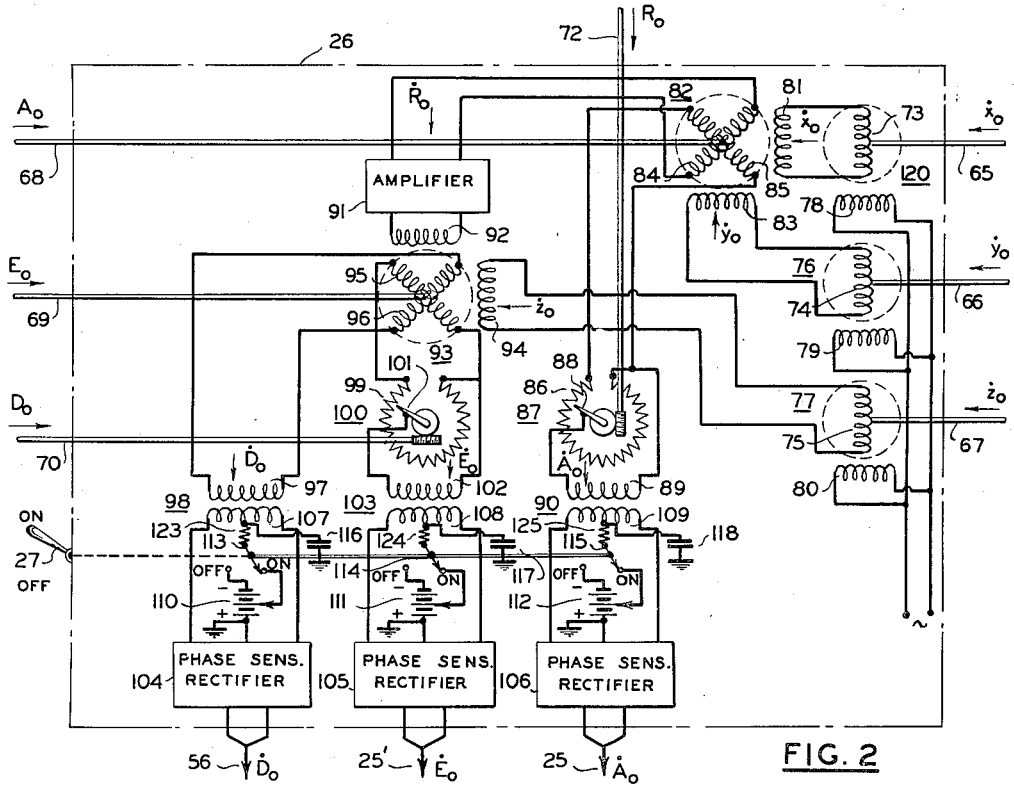
Fig. 2 is a schematic and wiring diagram of the regenerative tracking mechanism of Fig. 1.

One embodiment of suitable regenerative tracking mechanism for solving Equations 1 to 4 is shown in Fig. 2. As there shown, input shafts 65, 66 and 67, the angular displacements of which represent the rectangular coordinate rates $\dot{x}$, $\dot{y}$, $\dot{z}$, respectively, actuate rotor windings 73, 74 and 75 of rotary transformers 120, 76 and 77. Each of these rotary transformers have their stator windings 78, 79 and 80 supplied from a constant source of alternating voltage. The rotor windings are each shown at right angles to their respective stator windings, in which position zero voltage will be induced in these rotor windings. This zero voltage position of the rotor windings corresponds to the zero displacement positions of shafts 65, 66 and 67. As is well known, as the rotor windings are rotated from their zero signal position, a voltage will be induced therein proportional to the sine of the angle through which they have been rotated. For small angles of rotation from the zero position, the induced voltage will be substantially proportional to the angle itself. The proportionality factor between the angular displacements of shafts 65, 66 and 67 and the component target rates represented thereby is made by design such that the rotor windings are only rotated through small angles for the maximum target rates likely to be encountered. Accordingly, the voltage induced in rotor windings 73, 74 and 75 will be substantially proportional to the rectangular target rates $\dot{x}$, $\dot{y}$ and $\dot{z}$, respectively.

The induced voltage in rotor winding 73 is applied across one stator winding 81 of a rotary transformer 82. Similarly, the induced voltage in rotor winding 74 is applied across another stator winding 83 of rotary transformer 82. Stator windings 81 and 83 of rotary transformer 82 are in spaced quadrature, that is, the magnetic fluxes produced by these two windings are at right angles with respect to each other. These magnetic fluxes are superimposed upon each other in rotary transformer 82 and will each induce a component voltage in rotor windings 84 and 85. Rotor windings 84 and 85, which are also in spaced quadrature, are actuated in accordance with present azimuth ($A_0$) from input shaft 68.

The component voltage induced in rotor winding 85 as a result of the voltage across stator winding 83 will be proportional to the voltage across stator winding 83 and the cosine of the angle through which the rotor winding has been displaced. This component will therefore be equal to the quantity $\dot{y}_0 \cos A_0$. The component voltage induced in winding 85 from stator winding 81 will be proportional to the quantity $\dot{x}_0 \sin A_0$ and will be of the opposite phase. Accordingly, the total resultant voltage induced in winding 85 will be proportional to the quantity $\dot{y}_0 \cos A_0 - \dot{x}_0 \sin A_0$.

This resultant voltage is placed across the resistive winding 86 of a potentiometer unit 87, the movable contact arm 88 of which is actuated in accordance with present horizontal range ($R_0$) from input shaft 72. Winding 86 is wound such that the resistance from one terminal to the point of contact with movable arm 88 varies inversely with the angular displacement of the contact arm. Thus, the output voltage existing between contact arm 88 and one terminal of winding 86 will be proportional to the voltage applied to the terminals of winding 86 and inversely proportional to the angular rotation of shaft 72. This output voltage, which is applied across the primary winding 89 of transformer 90, will therefore be proportional to the quantity $$\frac{\dot{y}_0 \cos A_0 - \dot{x}_0 \sin A_0}{R_0}$$

which quantity will be seen to be equal to the desired target azimuth rate ($\dot{A}_0$) in accordance with Equation 1.

By similar reasoning, it will be apparent that the voltage induced in rotor winding 84 will be proportional to the quantity $\dot{x}_0 \cos A_0 + \dot{y}_0 \sin A_0$, which quantity is equal to $\dot{R}_0$ in accordance with Equation 4. This voltage, corresponding to horizontal range rate, is introduced into an amplifier 91, and the output is employed to energize one stator winding 92 of a rotary transformer 93. The other stator winding 94 is positioned in spaced quadrature with respect to winding 92, and is energized in accordance with vertical rate ($\dot{z}_0$) from winding 75 of rotary transformer 77.

Rotary transformer 93 has two rotor windings 95 and 96 also mounted at right angles with respect to each other and both positioned in accordance with present elevation ($E_0$) from input shaft 69. Accordingly, there will be induced in rotor winding 96 a voltage proportional to the quantity $\dot{R}_0 \cos E_0 + \dot{z}_0 \sin E_0$, which quantity is equal to target slant range rate ($\dot{D}_0$) as shown in Equation 3. This slant range rate voltage signal is employed to energize the primary winding 97 of a transformer 98.

Rotor winding 95 of rotary transformer 93 will have induced therein a voltage proportion to the quantity $\dot{z}_0 \cos E_0 - \dot{R}_0 \sin E_0$, and this voltage is placed across the opposite terminals of the resistive winding 99 of potentiometer unit 100. Winding 99 is wound so as to have an inverse relationship of resistance with respect to angular position similarly to winding 86 of potentiometer 87. A movable contact arm 101 of potentiometer unit 100 is angularly displaced in accordance with target slant range ($D_0$) from input shaft 70. Accordingly, there will be produced between contact arm 101 and one terminal of winding 99 a voltage proportional to the quantity $$\frac{\dot{z}_0 \cos E_0 - \dot{R}_0 \sin E_0}{D_0}$$

which quantity is equal to the target elevation rate ($\dot{E}_0$) as shown in Equation 2. This target elevation rate voltage is employed to energize primary winding 102 of a transformer 103.

It will now be seen that voltage signals corresponding to the spherical coordinate target rates ($\dot{A}_0$, $\dot{E}_0$ and $\dot{z}_0$) have been computed as required. However, these signals are all in the form of alternating voltages corresponding in magnitude and phase to the quantity represented thereby. In order to transform these alternating voltage signals into direct voltage signals having a magnitude and polarity corresponding to the quantities represented thereby, any suitable type of phase-sensitive rectifiers 104, 105 and 106 may be employed. These phase-sensitive rectifiers essentially comprise two vacuum tubes connected so as to have their respective plate currents flow in opposite directions through a suitable resistive load, across the terminals of which the desired direct voltage output is obtained on output leads 56, 25' and 25. The opposite terminals of secondary windings 107, 108 and 109 of transformers 98, 103 and 90 are respectively connected to the grids of the two vacuum tubes included within phase-sensitive rectifiers 104, 105 and 106.

In order to provide a bias voltage for the grids of each of these tubes, batteries 110, 111 and 112 are provided, the grounded positive terminals of which are connected to the cathodes of the tubes. Switches 113, 114 and 115 are schematically indicated as being simultaneously operated from the on-off switch 27. In the "on" position of these switches, a connection is made from a midpoint of each of the windings 107, 108 and 109 through resistors 123, 124 and 125, respectively, to the point on the batteries 110, 111 and 112, respectively, which will provide a proper operating bias voltage for the tubes. In the "off" position of these switches, however, the midpoint of windings 107, 108 and 109 are connected to the negative terminal of batteries 110, 111 and 112, respectively, to provide a bias voltage for the tubes of a magnitude beyond the cut-off value, to thereby prevent the tubes from operating. The midpoints of windings 107, 108 and 109 are connected to ground through condensers 116, 117 and 118, respectively.

Accordingly, when switch 27 is in its "on" position, there will be produced in output leads 56, 25' and 25 direct voltages corresponding to slant range rate, elevation rate, and azimuth rate, as desired. On the other hand, when switch 27 is in its "off" position, zero voltages will be produced across these leads since the rectifiers are then rendered inoperative. The effect of condensers 116, 117, and 118 and resistors 123, 124 and 125 will be to prevent the bias voltage on the grid of the tubes from going from its operating value to a value beyond cut-off immediately as the switch is changed from an "on" to an "off" position, and vice versa. Thus, as switch 27 is changed from an "off" to an "on" position, the direct voltage on output leads 56, 25' and 25 will only gradually build up to their proper values corresponding to the voltages across windings 97, 102 and 89 of transformers 98, 103 and 90.

In the previous description of the operation of the regenerative tracking mechanism, it was assumed that the regenerative tracking unit was in operation during the process of getting on the target and establishing proper tracking. Another mode of operation is to initiate correct tracking originally with the regenerative tracking mechanism not operating, that is, with switch 27 in the "off" position. In such a case, the automatic radio or manual optical tracking systems alone would be employed to initially establish correct tracking. With correct tracking established, the proper angular rate voltages will be produced across primary windings 97, 102 and 89, but these voltages would be ineffective in producing voltages across output leads 56, 25' and 25, since switch 27 would be in its "off" position. Now when switch 27 is placed in its "on" position, the proper spherical coordinate rate voltage signals for the servos will build up in leads 56, 25' and 25, but because of the previously explained operation of condensers 116, 117 and 118 and resistors 123, 124 and 125 these voltages will build up gradually, giving the manual operator or the radio apparatus time to gradually diminish the rate voltages supplied by them to zero. In this way the regenerative tracking mechanism can take over without any interruption in the proper tracking of the target.

By employing regenerative tracking mechanism as described, more accurate tracking is obtained both in radio automatic and in optical manual operation. In optical manual operation, for instance, it will be clear that the azimuth and elevation operators need only supply that component of voltage to the azimuth and elevation servos to compensate for the amount the rate voltage signals supplied by the regenerative tracking system may be in error. During the times that the target is flying at constant speed and course and the operation of the regenerative tracking mechanism has become fully established, the azimuth and elevation operators have nothing to do at all. Thus, since their job is made simpler, they can accomplish it in a much more accurate manner.

In radio automatic operation the advantages of the regenerative tracking mechanism are even more pronounced. Thus, if we assume that the target is flying a course such that the present position shafts must be continuously operated by their respective servos, for example, as straight line course, it will be seen that error signals must be continuously supplied to the servos from the radio sighting system in order to cause the present position shafts to move at all. But the radio sighting system can only supply error voltages when an actual error exists between the line of sight defined by the radio system and the actual target orientation. Accordingly, were the radio sighting system alone to be employed for tracking a moving target, perfect tracking could never be accomplished, since there would always have to be some error in order to actuate the servos. Of course, this error can be made very small by having a very high amplification factor in the servos. By employing the regenerative tracking system in conjunction with the radio sighting system, however, it is possible to completely eliminate these errors during the times that the target is flying a constant course and speed. In such a case, the regenerative tracking system is supplying all of the voltage required by the servos in order to properly track the target, and the radio sighting system is supplying zero error voltages, which means that no errors exist between the line of sight defined by the radio sighting system and the actual target orientation.

Figures 3, 4:
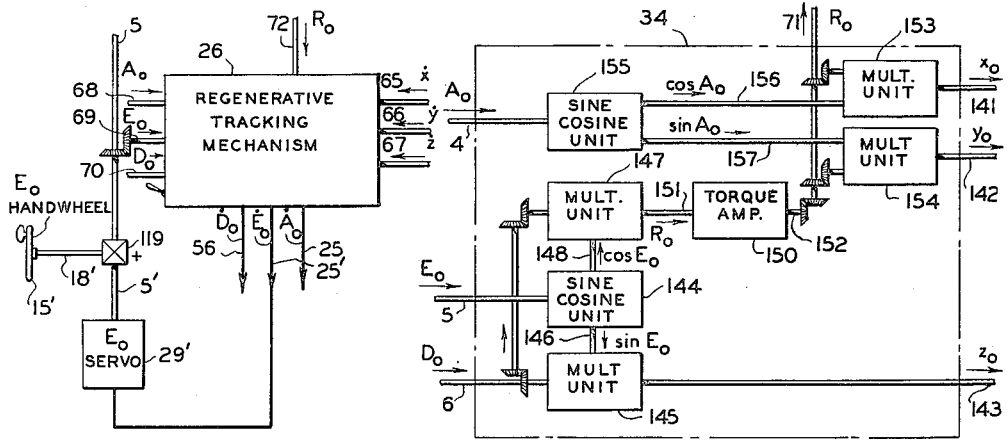
Fig. 3 is a schematic drawing illustrating an alternate method of adapting the regenerative tracking mechanism of Fig. 2 to a gun director.
Fig. 4 is a schematic drawing of the rectilinear converters of Fig. 1.

The regenerative tracking mechanism 26 may be employed in conjunction with an entirely different type of tracking systems than that shown in Fig. 1, and previously described. One example of an entirely different type of tracking system employing regenerative tracking mechanism 26 is illustrated in Fig. 3, wherein only control in elevation is shown, the azimuth and slant range controls being identical thereto. In Fig. 3 the regenerative tracking mechanism is shown operating only in conjunction with manual tracking, no provision being made for radio automatic tracking.

As shown in Fig. 3, the same regenerative tracking mechanism 26 having the same inputs and outputs as shown in Fig. 2, and previously described, is employed. In this case, however, the servo voltage signals are wholly supplied from the output voltage leads 56, 25' and 25 of the regenerative tracking mechanism. Thus, lead 25' is connected directly to the elevation servo 29'. The elevation servo 29' actuates the present elevation shaft 5 through intermediate shafting 5' and differential 119. The other input member of differential 119 is actuated from shaft 18', which in turn is controlled by the elevation operator through the elevation handwheel 15'. As before, the servo unit is of the type such that output shaft 5' is driven at a rate proportional to the magnitude of the signal received on lead 25'.

It will be seen that present position shaft 5, which controls the tracking telescope in elevation, has two components of control, one component being provided by the elevation handwheel operator and the other component being provided by the elevation servo as controlled by the regenerative tracking mechanism 26. Thus, regardless of the voltage signals existing at any particular time on lead 25' and the corresponding rate of rotation of shaft 5', the actual position of shaft 5 and of the tracking telescope is completely under the control of the operator. The operator therefore displaces his handwheel 15', and the tracking telescope, as required in order to initially establish correct tracking. When correct tracking has been established, the regenerative tracking mechanism 26 will cause shaft 5' to rotate at the rate required in order to maintain correct tracking. Thus, the component of control which the elevation handwheel operator must introduce in order to maintain correct tracking will have been reduced to zero, and thereafter the elevation handwheel operator will only have to compensate for changes in target course and speed.

All of the apparatus thus far described has for its purpose the positioning of shafts 4, 5 and 6 in accordance with the present position of the target in azimuth, elevation and slant range, respectively. This spherical coordinate present position data is received by the rectilinear converter 34 which transforms this spherical coordinate data into corresponding present position rectangular coordinate data ($x_0$, $y_0$ and $z_0$), which is produced as proportional angular displacements of output shafts 141, 142 and 143, respectively. As a necessary step in this computation, present horizontal range ($R_0$) is obtained, and this appears as a proportional rotation of output shaft 71.

The rectilinear converter 34, which is shown in Fig. 4, consists essentially of two types of computing components, (1) multiplying units and (2) sine and cosine units, both of which are dead-beat mechanical calculators. The multiplying units are preferably of the type described in U. S. Patent No. 2,194,477, for Multiplying Machines, issued March 26, 1940, in the names of W. L. Maxson and P. J. McLaren. As described in that patent, such a multiplying unit is adapted to produce a rotation of its output shaft instantaneously equal to the product of the rotations of its two input shafts.

The principal element of the above-mentioned Patent No. 2,194,477 is a spiral gear having teeth mounted thereon in such a path that a follower gear in contact with these teeth is rotated by an amount proportional to the square of the amount of rotation of the spiral gear. The sine and cosine units may consist of two such spiral gears, the path traced out by the teeth of each of which is modified such that in one case the rotation of the driven follower gear is proportional to the sine of the rotation of the spiral gear, and in the other case the rotation of the driven follower gear is proportional to the cosine of the rotation of the spiral gear. The Maxson sine and cosine unit is a well-known device of this character.

Referring again to Fig. 4, present elevation ($E_0$) data is supplied to the sine and cosine unit 144 from input shaft 5. The sine and cosine unit 144 calculates sin $E_0$ and cos $E_0$, and transmits sin $E_0$ to the multiplying unit 145, as by shaft 146, and transmits cos $E_0$ to the multiplying unit 147, as by shaft 148. Multiplying unit 145, having also received slant range ($D_0$) from input shaft 6, produces as a proportional rotation of its output shaft 143 the vertical component ($z_0$) of the present target position, which is the product $D_0$ sin $E_0$. Similarly, the horizontal component ($R_0$) of slant range ($D_0$), which is the product of $D_0$ received from shaft 6 and cos $E_0$ received on shaft 148, is obtained in multiplying unit 147, and is transmitted to a dead-beat torque amplifier 150 by shaft 151. The torque amplifier 150 may be of any suitable type adapted to produce as on output shaft 152 a torque amplified signal ($R_0$) which is identical to the input signal ($R_0$) on shaft 151 but for its greater torque. The well-known torque amplifying device consisting of contacts, a capacitance motor and a Lancaster damper may, for example, be used for this purpose.

The torque amplified horizontal range signal ($R_0$) appearing on shaft 152 is transmitted through gearing to horizontal range output shaft 71. This horizontal range signal is also introduced into multiplying units 153 and 154. Sine and cosine unit 155, having received present azimuth ($A_0$) on input shaft 4, calculates cos $A_0$ and sin $A_0$, and transmits the former to the multiplying unit 153, as on shaft 156, and transmits the latter to multiplying unit 154, as on shaft 157. Multiplying unit 153, having received cos $A_0$ from the sine and cosine unit 155 and $R_0$ from the torque amplifier 150, produces as a proportional rotation of its output shaft 141 the east-west coordinate ($x_0$) of the present position of the target, which is the product $R_0$ cos $A_0$. Zero azimuth is taken as the position $x$, or east direction, and the positive azimuth direction is taken as counterclockwise. Similarly, multiplying unit 154, having received sin $A_0$ from the sine and cosine unit 155 and $R_0$ from the torque amplifier 150, produces as a proportional rotation of its output shaft 142 the north-south coordinate ($y_0$) of the present position of the target, which is the product $R_0$ sin $A_0$.

There are thus produced on output shafts 141, 142, and 143 of rectilinear converter 34 angular displacements proportional to the $x$, $y$, and $z$ components of the present position of the target, referred to the director as the origin of the coordinate system. In order to convert this present position data into corresponding rectangular coordinate data having the guns as the origin of the coordinate system, three parallax knobs 161, 162, and 163 are provided which may be respectively displaced in accordance with the linear distance from the guns to the director in the east-west ($x$) direction, north-south ($y$) direction, and vertical ($z$) directions, respectively. The displacements of knobs 161, 162 and 163 are additively combined in differentials 164, 165 and 166 with the displacements of shafts 141, 142, and 143, respectively, to thereby produce upon shafts 167, 168, and 169, respectively, angular displacements proportional to the $x$, $y$, and $z$ components of the present position of the target, with the origin of the rectangular system taken at the guns.

It will be understood that knobs 161, 162 and 163 have associated therewith a relatively movable dial and index so that the operator may know when he has set in the proper parallax. Such a dial and index will be understood to be associated with all other knobs provided on the director for setting in data.

The present position rectangular coordinate data, now represented as proportional rotations of shafts 167, 168 and 169, are introduced into the differentiating, smoothing and predicting circuit 61. Time of flight ($t_p$) data is also introduced into the predicting circuit 61 as a proportional rotation of input shaft 170 which is actuated from time of flight shaft 13 through shaft 171 and the interconnecting gearing. As previously noted, it is the function of predicting circuit 61 to differentiate the rectangular coordinate input data to thereby obtain the component target rates in rectangular coordinates, which are produced as angular displacements of output shafts 62, 63, and 64. These rates are then multiplied by the time of flight in order to obtain the rectangular coordinates of prediction, that is, the distance the target moves during the projectile time of flight. The rectangular coordinates of prediction are then additively combined with the rectangular coordinates of the present position of the target to obtain the rectangular coordinates of the predicted future position of the target ($x_p$, $y_p$ and $z_p$), which are then produced as corresponding angular displacements of output shafts 172, 173 and 174, respectively.

Also introduced into the predicting circuit 61 are wind rate corrections ($\Delta \dot{x}_w$) and ($\Delta \dot{y}_w$). These corrections are obtained from wind corrector 175 and are transmitted to predicting circuit 61 as proportional rotations of shafts 176, 177 and 178, 179, respectively. These wind correction rates are additively combined with the $x$ and $y$ component rates before these rates are multiplied by time of flight to obtain prediction, in order to compensate for the effect of wind on the projectile after it leaves the gun. A sensitivity adjustment knob 180 is also provided whereby the dynamic characteristics of differentiating, smoothing and predicting circuit 61 may be varied.

In Fig. 5 there is shown that portion of the differentiating, smoothing, and predicting circuit which operates on the $x$ component. As is there shown, the $x_0$ present position input shaft 167 operates into a differentiating circuit consisting essentially of variable speed drives 181 and 182 and their associated shafts and differentials. This smoothing and differentiating circuit operates to produce upon shaft 183 an angular rotation proportional to a smoothed version of the $x$ component of the present position of the target, the unsmoothed version of which is represented by the angular displacement of input shaft 167. Also, the smoothing and differentiating circuit operates to produce upon shaft 184 an angular displacement proportional to a smoothed version of the component target rate ($\dot{x}_0$) in the $x$ direction. Shaft 184 is connected to output shaft 62 which shaft is thereby displaced in accordance with the $x$ component of target rate ($\dot{x}_0$).

This component target rate ($\dot{x}_0$) is additively combined in differential 185 with the $x$ wind rate correction ($\Delta \dot{x}_w$) received on shaft 177. The output of differential 185 appearing on shaft 186 represents the $x$ component of target rate ($\dot{x}_0$) corrected for wind. This quantity is introduced into a multiplying unit 187 which may also be of the type described in previously mentioned U. S. Patent No. 2,194,477. Multiplying unit 187 operates to obtain the product ($\dot{x}_0, t_p$) of the component target rate received on shaft 186 and the time of flight received on shaft 170, and this product, representing the $x$ component of prediction, is produced as an angular displacement of shaft 188. The angular displacement of shaft 188 is then combined in differential 158 with the angular displacement of shaft 183 to thereby produce an angular displacement of output shaft 172 proportional to the sum of the $x$ component of present position and the $x$ component of prediction, and therefore proportional to the $x$ component of the future position of the target ($x_p$). The $y$ and $z$ components of the future position ($y_p$ and $z_p$) are obtained as proportional rotations of output shafts 173 and 174, respectively, in predicting circuit 61, by apparatus identical with that shown in Fig. 5 for obtaining the $x$ component of the future position of the target, except that no wind rate correction is introduced in obtaining the $z$ component.

It was previously stated that the two variable speed drives 181 and 182 operate on the $x_0$ signal, received as a proportional rotation of input shaft 167, to produce, as a proportional rotation of shaft 183, a smoothed signal in which the spurious perturbations contained in the $x_0$ input signal have been averaged out, and on shaft 184 a signal corresponding to the smoothed time derivative, or rate of change, of the input $x_0$ signal. The manner in which this is accomplished will now be described.

The $x$ component ($x_0$) of the present target position, as indicated by the angular displacement of input shaft 167, is connected into an equating differential 189, the output shaft 190 of which is positioned in accordance with the difference between the angular displacements of input shafts 167 and 183. Shaft 190 positions the ball-carriage 191 of variable speed device 182 through rack and pinion arrangement 192 and other suitable interconnecting gearing. As is well known, ball carriage 191 transmits the motion of the disc 193, which will, for the present, be assumed to be driven at a constant speed, to the cylinder 194 in such a way that the rate of rotation of cylinder 194 is proportional to the displacement of ball carriage 191 from the center of disc 193.

The angular displacement of cylinder 194 is connected, as by shaft 195, into a second differential 196, the other input of which is supplied from shaft 190 through interconnecting shaft 197. The output of differential 196, which is the algebraic sum of its two inputs, actuates the shaft 198, which in turn displaces the ball carriage 199 of the second variable speed device 181 through rack and pinion gearing 200. Ball carriage 199 of variable speed device 181 variably transmits the rotation of the disc 201, which is driven by the constant speed motor 202, to the cylinder 203. The cylinder is connected as by shaft 204 to actuate one input member of a differential 205. The other input member of the differential 205 is actuated in accordance with the displacement of cylinder 194 of variable speed device 182 through shafting 195, 184 and 206. The output member of differential 205, which is thus actuated in accordance with the algebraic sum of the displacements of shafts 204 and 206, is connected to output shaft 207, which in turn actuates the smoothed present position shaft 183, which then supplies the subtractive input to equating differential 189.

In considering the operation of the smoothing and differentiating circuit, it will first be assumed that the variable speed device 182 and the differential 196 are omitted so that shaft 198 is directly actuated from shaft 190. The circuit would then constitute the ordinary differentiating circuit which, as is well known, would reach a condition of equilibrium when the ball carriage 199 had assumed such a position that the angular rate of rotation of shaft 183 was equal to the angular rate of rotation of the input ($x_0$) shaft 167. At equilibrium the angular position of shaft 198 would represent the time derivative ($\dot{x}_0$) smoothed to a certain extent. Shaft 183 would be actuated in accordance with $x_0$, also smoothed to a certain extent, but it would lag ($x_0$) by an amount proportional to the displacement of ball carriage 199 from its central position, so that it could not be employed as a source of smoothed present position data.

By incorporating the additional variable speed device 182 in the circuit, the lag is automatically removed from shaft 183 so that its angular position is an accurate, smoothed indication of the ($x_0$) present position data. Also a much more effectively smoothed time derivative ($\dot{x}_0$) is obtained as a proportional rotation of the ($\dot{x}_0$) shaft 184.

With the variable speed device 182 incorporated in the circuit it will be seen that the circuit can no longer reach equilibrium when the rate of rotation of shaft 183 first equals that of shaft 167, because at this time shaft 190, and consequently ball carriage 191 of variable speed device 182, will be displaced an amount proportional to the previously mentioned angular displacement lag of shaft 183 with respect to shaft 167. Therefore, at this time the cylinder 194 is still rotating, and will continue to act through differential 196 to rotate shaft 198 and thereby further displace ball carriage 199 of variable speed device 181, with the result that the rate of rotation of shaft 183 will begin to exceed that of shaft 167.

The output shaft 190 of equating differential 189 will then begin to rotate in a direction opposite to its original rotation so as to drive the ball carriage 191 back to its position of zero displacement. Therefore, it is seen that in the differentiating circuit of the present invention, equilibrium can only be reached when the rate of rotation of shaft 183 is equal to that of shaft 167 and when there is no angular displacement lag between the two shafts, that is, when shaft 190 and ball carriage 191 have returned to their zero displacement positions.

Since one condition for equilibrium in the present circuit is that there be no angular displacement lag of shaft 183 with respect to the ($x_0$) input shaft 167, it is apparent that the angular displacement of the ($x_0$) shaft 183 is proportional to a smoothed value of $x_0$.

Also, since the rate of rotation of shafts 183 and 167 are equal at equilibrium, that is, when ball carriage 199 is stationary, the angular displacement of shaft 198 is proportional to a smoothed version of the time derivative ($\dot{x}_0$) as in the ordinary differentiating circuit which does not incorporate the variable speed device 182. At equilibrium, however, it was seen that shaft 190, which provides one input to differential 196, had returned to a position of zero displacement so that the total angular displacement of shaft 198 must have been produced from shaft 195 which is the other input to differential 196. Therefore, the angular displacement of shafts 195 and 184 is also proportional to the smoothed time derivative ($\dot{x}_0$).

Furthermore, since shaft 195 does not respond to changes in the rate of rotation of input shaft 167, that is, to changes in the time derivative ($\dot{x}_0$), as quickly as does shaft 198, the time derivative ($\dot{x}_0$) which is obtained as a proportional rotation of shaft 184 is more effectively smoothed than the time derivative which would appear as a proportional rotation of shaft 198 in the ordinary differentiating circuit employing only one variable speed device.

The smoothing, differentiating and predicting circuit shown in Fig. 5 is identical to that employed in previously mentioned copending application Serial No. 470,686 with the sole exception that the loop consisting of shaft 206 and differential 205 have been added in the present circuit. As explained in that application, the differential equation for the prior circuit without this loop may be obtained and from a mathematical analysis of this differential equation the curves shown in Fig. 6 giving the dynamic characteristics of the circuit without the additional loop may be plotted.

The dynamic characteristics of interest are:
(1) The settling time, which may be defined as the time after which all response errors are negligible (less than an arbitrary value), and
(2) The amplitude ratio, which may be defined as the ratio of the amplitude of sinusoidal perturbations existing on the predicted position output data to the amplitude of the sinusoidal perturbations superimposed upon the present position input data.

The settling time curves are based on a constant rate of change ($\dot{x}_0$) of the $x$ coordinate of the present position of the target equal to 150 yards per second, a constant time of flight equal to 20 seconds, and a negligible response error in future position ($x_p$) defined as an error less than 75 yards. The amplitude ratio curves are based on a constant perturbation frequency of $$\frac{2}{\pi}$$

cycles per second and a constant time of flight equal to 20 seconds. The values of settling time and amplitude ratio are as indicated on the various curves. As shown, the circuit may have underdamped or overdamped response characteristics depending on whether values of circuit constant $K_1$ and $K_2$ are chosen so as to define an operating point above or below the line 208, each point on which represents critically damped operation. Line 209 is the locus of all points having underdamped operation in which the first overshoot peak is equal to 75 yards.

Figure 6:
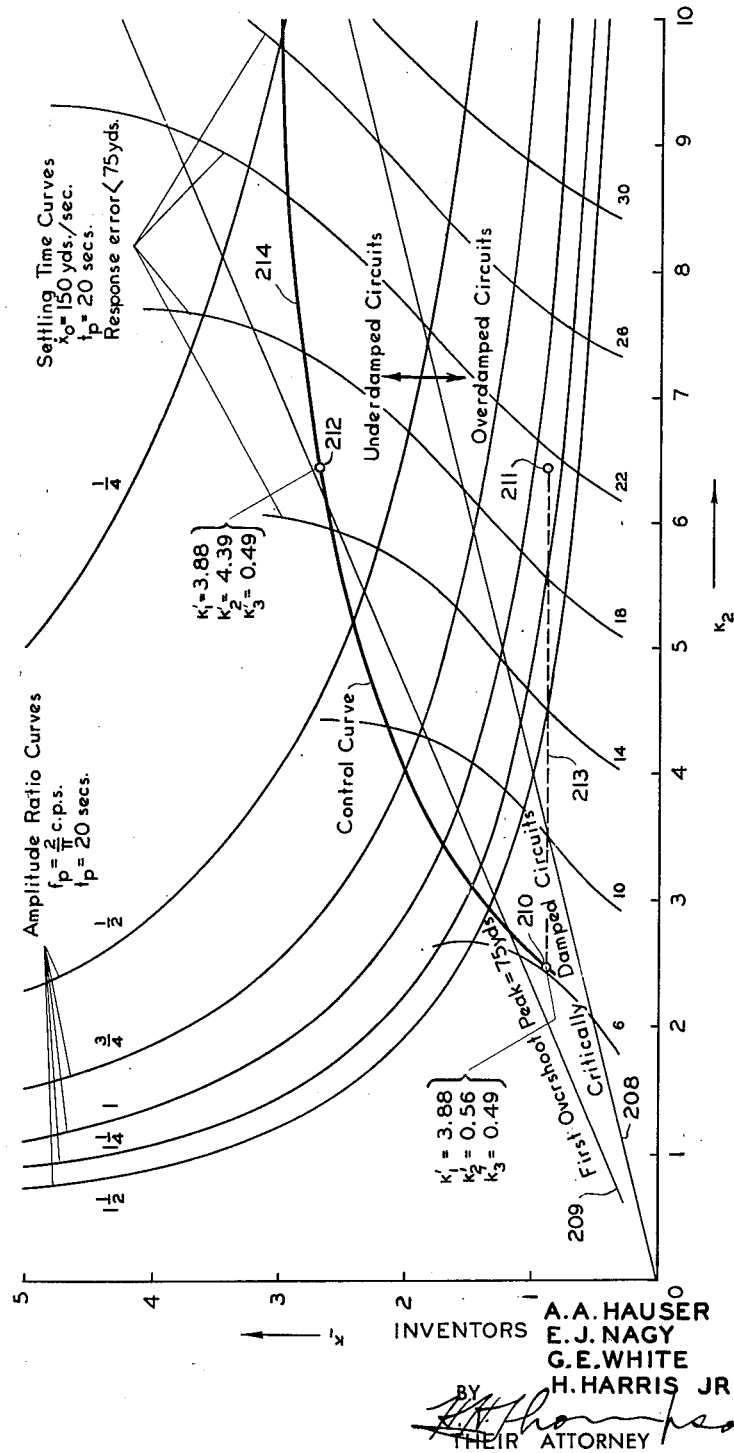
Fig. 6 is a chart giving the dynamic characteristics of the smoothing, differentiating and predicting circuit of Fig. 5, and illustrating the method of varying the dynamic characteristics during operation of the circuit.

The curves of Fig. 6 then indicate the various settling times and amplitude ratios for the prediction circuit of said copending application, that is the prediction circuit of the present application with the loop consisting of shaft 206 and differential 205 eliminated, for various values of circuit constants $K_1$ and $K_2$. The circuit constants $K_1$ and $K_2$ are the proportionality factors for the variable speed devices of the prior circuit which devices would correspond to variable speed devices 181 and 182, respectively, of the present circuit. Numerically, $K_1$ would be equal to the ratio of an increment in the angular displacement of shaft 198 to the resulting increment in the angular velocity of cylinder 203, and $K_2$ would be equal to the ratio of an increment in the angular displacement of shaft 190 to the corresponding increment in the angular velocity of the cylinder 194, assuming in both cases that the additional loop of the present circuit is not present.

Thus, as more fully explained in the aforesaid copending application Serial No. 470,686, any particular values of $K_1$ and $K_2$ correspond to the point on the chart of Fig. 6 at which the circuit will operate. Accordingly, it was possible to pick out that point of operation on the chart having the desired dynamic characteristics, i. e., settling time and amplitude ratio, and to operate at that point by designing the circuit to have the numerical values of $K_1$ and $K_2$ indicated on the chart.

In the circuit of the present invention, wherein the additional loop consisting of shaft 206 and differential 205 are included, the same method of design holds true. However, in this case a new constant $K'_3$ is introduced, which is the proportionality factor of the new loop, that is, the proportionality factor relating the displacement of shaft 184 to the amount of that displacement which is introduced into differential 205 to be added to the displacement of shaft 204. It will be apparent that $K'_3$ is dependent upon the gear ratios chosen in designing the additional loop. Also, the numerical values of the variable speed drive proportionality factors in the old and new circuits will have to be different in order for the circuits to have the same dynamic characteristics. These variable speed proportionality factors for the new circuit containing the additional loop will be designated $K'_1$ for variable speed drive 181 and $K'_2$ for variable speed drive 182. The values of $K'_1$ and $K'_2$ required in order to operate at any particular point on the chart will depend upon the value of $K'_3$ chosen for the new loop. In fact the prior circuit can be thought of as a specific case of the new circuit, wherein $K'_3$ is chosen as zero, that is, the new loop is non-existent. Thus, in that specific case the values of $K'_1$ and $K'_2$ come out equal to $K_1$ and $K_2$, respectively. For values of $K'_3$ other than zero, different values of $K'_1$ and $K'_2$ will be required in order to operate at the same point.

Thus, the present circuit will have three circuit constants $K'_1$, $K'_2$ and $K'_3$ the values of which determine the point of operation on the chart of Fig. 6, and therefore determine the dynamic characteristics of the circuit. The values of $K'_1$ and $K'_2$ required in order to operate at a particular point will be dependent upon the value of $K'_3$ chosen. If it is desired to operate at a particular point with a particular value of $K'_3$, the factors $K_1$ and $K_2$ corresponding to that point can be obtained from the chart. The circuit constants $K'_1$ and $K'_2$ can then be obtained from the following formulae:

$$(5) \quad K'_1 = \frac{K_2 \pm \sqrt{K_2^2 - 4K_1K_2K'_3}}{2K'_3}$$

$$(6) \quad K'_2 = \frac{K_2 \pm \sqrt{K_2^2 - 4K_1K_2K'_3}}{2}$$

The circuit of the present invention can then be designed to have these values of $K'_1$, $K'_2$ and $K'_3$.

As more fully explained in copending application Serial No. 470,686, it is desirable to alter the dynamic characteristics of the circuit during the solution of the prediction problem so as to obtain a low settling time during the time of response to a change in present position input rate, and a low amplitude ratio, that is, good smoothing characteristics, thereafter. In the circuit of the prior application means were provided to alter the speed of the disc 193 during operation to thereby alter $K_2$. In this way the point of operation could be changed from some point such as point 210, having a fast response to some other point, such as point 211, having a slower response and better smoothing characteristics.

It will be noted that in the prior circuit, as $K_2$ changes, the point of operation must move along the dash line 213 in a direction parallel to the $K_2$ axis. This represents a disadvantageous limitation to the circuit of the prior application since complete freedom in choosing both the initial and final operating points is not permitted. For instance, it is desirable to be operating at underdamped points both initially and finally, and this cannot be accomplished with the prior circuit and still have any substantial change in dynamic characteristics since dash line 213 crosses into the underdamped region not far from initial point 210.

The addition of the new loop in the present circuit overcomes this undesired limitation and allows complete freedom of choice in picking the initial and final operating points. This comes about because of the existence of the additional circuit constant $K'_3$. With $K'_3$ equal to zero, that is, in the prior circuit which has no additional loop, it has been stated that as $K_2$ is varied the operating point travels along dash line 213. However, in the new circuit, having a definite value of $K'_3$, as we vary $K'_2$ the operating point will travel along some line such as 214. This line may be called the sensitivity control curve for that value of $K'_3$. As $K'_3$ approaches zero, the control curve approaches dash line 213. Thus, since the value of $K'_3$ determines the direction of the control curve, it is possible to obtain whatever control curve is desired, subject to the sole limitation that the control curve cannot have a negative slope.

Accordingly, it is possible to choose a desirable initial operating point, such as point 210, and to choose a desirable final operating point, such as point 212, the only limitation being that point 212 may not be below point 210. Since it is desired to maintain underdamped operation for both points, this condition is a desirable one anyway so that it really does not represent a limitation. Having chosen these two points it is then possible to choose a value of $K'_3$ such that the corresponding control curve passes through these two points.

Referring again to Fig. 5, the apparatus for varying the circuit constant $K'_2$ is controlled by a sensitivity control knob 180, the rotation of which proportionately displaces ball carriage 215 of a variable speed drive 216 through shaft 217, gearing 218, shaft 219, and rack and pinion gearing 220. Disc 221 of variable speed device 216 is driven from a constant speed motor 222. The cylinder 223 of variable speed device 216 actuates the disc 193 of variable speed device 182, the speed of which determines the circuit constant $K'_2$. Thus, by operation of sensitivity control knob 180 it is possible to vary $K'_2$ as desired and to operate anywhere on control curve 214 of Fig. 6 that is desired. If desired, a spring and detent arrangement could be provided associated with control knob 180 so as to provide an indication to the operator of the particular settings of knob 180 corresponding to particular points of operation, such as points 210 and 212 of Fig. 6.

If desired a sensitivity control could be provided for each of the $x$, $y$, and $z$ prediction circuits. It is contemplated, however, that the same sensitivity control is to be used for all three. It is understood, therefore, that the rotation of the cylinder 223 of variable speed device 216 is employed to actuate not only disc 193 of variable speed device 182, but also the corresponding discs of both the $y$ and $z$ prediction apparatus.

Referring again to Fig. 1, it was previously stated that a wind corrector 175 produced, as proportional rotations of output shafts 176 and 178, wind rate corrections $\Delta\dot{x}_w$, and $\Delta\dot{y}_w$, respectively, which corrections were added to the $x$ and $y$ components of target rate in the predicting circuit 61, respectively, in order to compensate for the effect of wind on the projectile. In order to compute these wind rate corrections, wind corrector 175 has set into it on knob 241 the wind velocity in the east-west, or $x$ direction, and on knob 242 the wind velocity in the north-south, or $y$ direction. The wind corrector 175 also receives quadrant elevation (Q. E.) as a proportional rotation of input shaft 243. Input shaft 243 is actuated from shaft 244 which in turn is actuated from shaft 245, the angular displacement of which is identical with that of quadrant elevation shaft 11. Time of flight $(t_D)$ is also set into the wind corrector on input shaft 246, which shaft is actuated from shaft 247, which in turn is actuated from shaft 248, the angular displacement of which is identical to that of the time of flight shaft 13. The wind corrector then solves for the $x$ wind rate correction $(\dot{x}_w)$ as a product of the east-west wind velocity and a predetermined function of time of flight and quadrant elevation. Similarly, the $y$ wind rate correction $(\Delta\dot{y}_w)$ is solved for as the product of the north-south wind velocity and the same function of time of flight and quadrant elevation. Thus, the $x$ and $y$ wind rate corrections, as solved for, may be expressed by the following formulas:

(7)

$\Delta\dot{x}_w = $(E-W wind velocity)$(K_1 t_p \cdot$ Q. E.$+ K_2 t_p + K_3$ Q. E.$)$ (8)

$\Delta\dot{y}_w = $(N-S wind velocity)$(K_1 t_p \cdot$ Q. E.$+ K_2 t_p + K_3$ Q. E.$)$ In previous gun directors, wherein the effect of wind on the projectile was compensated for by correcting the computed target rates, the east-west and north-south wind velocities themselves were employed as the wind rate corrections $\Delta\dot{x}_w$ and $\Delta\dot{y}_w$, respectively. However, such a method of correcting for wind velocity assumes that the actual displacement of the projectile due to the wind, will not be affected by the quadrant elevation of the guns, and that this displacement will vary linearly with time of flight. Neither of these assumptions are valid, and for this reason the composite function of time of flight and quadrant elevation is introduced into the present wind corrector.

Figure 7:
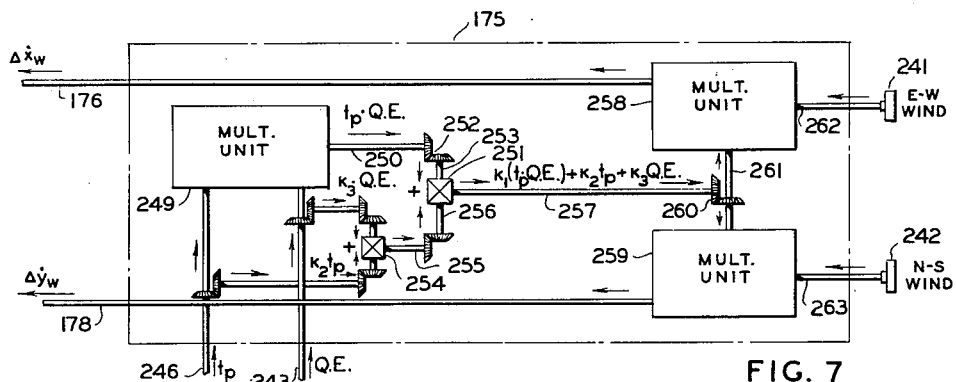
Fig. 7 is a more detailed schematic representation of the wind corrector of Fig. 1.

A detailed schematic drawing of the wind corrector 175 is shown in Fig. 7. As is there shown, time of flight and quadrant elevation, received as proportional rotations of shafts 246 and 243, respectively, are introduced into a multiplying unit 249 which may be of the type disclosed in the previously mentioned Maxson patent, but preferably is a simpler and lighter type, such as is disclosed in Fig. 13, and which will be described in detail hereinafter.

The product $(t_p \cdot$ Q. E.$)$ appears as a proportional angular displacement of output shaft 250 of multiplying unit 249. This product $(t_p \cdot$ Q. E.$)$ is introduced into a differential 251 through gearing 252 and shaft 253. Another differential 254 is provided, having one input member actuated proportionately to time of flight from shaft 246 through appropriate interconnecting shafts and gears, and a second input actuated in accordance with quadrant elevation from shaft 243 through suitable shafting and gearing. The output member of differential 254 thus actuates shaft 255 in accordance with the sum of its two input quantities, one input being proportional to time of flight $(K_2 t_p)$, and the other being proportional to quadrant elevation $(K_3$ Q. E.$)$. The sum $(K_2 t_p + K_3$ Q. E.$)$ is introduced into differential 251 through shaft 256. The output of differential 251, being proportional to the sum of its two inputs, may then be expressed by the quantity $(K_1 t_p \cdot$ Q. E.$+ K_2 t_p + K_3$ Q. E.$)$ which appears as a proportional angular displacement of shaft 257.

The angular displacement of shaft 257 is introduced into multiplier units 258 and 259 through gearing 260 and shaft 261. The composite functions of time of flight and quadrant elevation is thus multiplied in multiplying unit 258 by the east-west wind velocity, which is received as a proportional rotation of input shaft 262, and the product representing the $x$ wind rate correction $(\Delta\dot{x}_w)$ is produced as an angular displacement of output shaft 176. Similarly, the same composite function of time of flight and quadrant elevation is multiplied in multiplying unit 259 by the north-south wind velocity, received as a proportional angular displacement of input shaft 263, and the product representing the $y$ wind rate correction $(\Delta\dot{y}_w)$ is produced as an angular displacement of output shaft 178.

Figure 13:
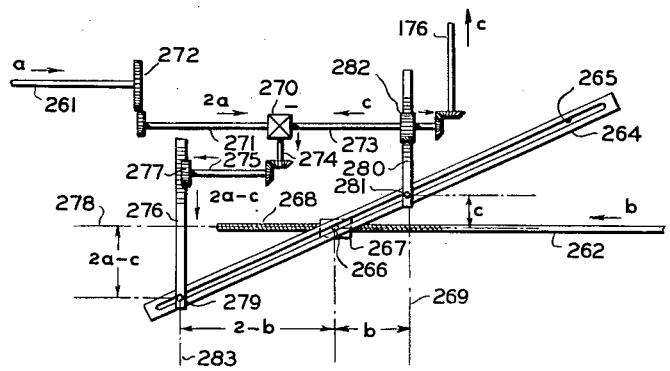
Fig. 13 is a drawing of a mechanical multiplier.

A simple and inexpensive linear multiplying unit which may be employed in ballistic mechanism, such as the wind corrector 175 wherein the extreme accuracy of a Maxson multiplying unit is not required, is shown in Fig. 13. For concreteness in the application of this multiplying unit to a particular problem the two input shafts and one output shaft are given the reference numerals of multiplying unit 258 of the wind corrector shown in Fig. 7. Thus, a first input quantity $(a)$ is introduced into the multiplying unit as a proportional rotation of input shaft 261, and a second input quantity $(b)$ is introduced as a proportional rotation of input shaft 262. Output shaft 176 is angularly displaced through the operation of the multiplying unit by an amount represented by the quantity $(c)$, which quantity is equal to the product $(ab)$ of the two input quantities.

As shown, a lever member 264 is provided with a slot 265 extending the length thereof. Lever member 264 is adapted to rotate about a movable pivot 266 which engages slot 265. Pivot 266 is carried by an internally threaded movable nut 267 which engages the threaded portion 268 of input shaft 262. Thus, as input shaft 262 is angularly displaced, pivot 266 is moved longitudinally by a proportionate amount from a zero reference position, indicated as line 269. Thus, the position of pivot 266 to the left of reference line 269 may be represented by the quantity $(b)$.

Input shaft 261, the angular rotation of which is proportional to the quantity $(a)$, is employed to actuate shaft 271 through gearing 272 having a gear ratio such that the angular rotation of shaft 271 represents the quantity $(2a)$. This quantity is introduced into the subtracting differential 270, another input of which is actuated in accordance with the output quantity $(c)$ from shaft 273. Thus, output shaft 274 of differential 270 is actuated in accordance with the quantity $(2a-c)$. Shaft 274 actuates shaft 275 which in turn actuates a vertically movable member 276 through a rack and pinion arrangement 277. Thus, member 276 is moved with respect to a reference line 278 an amount proportional to the quantity $(2a-c)$.

Member 276 has a projection 279 thereon engaging slot 265 of lever member 264. Another vertically movable member 280 has a similar projection 281 thereon also engaging slot 265. Thus, it will be apparent, as member 276 is displaced, lever member 264 will be rotated about pivot member 266, thereby causing vertical displacement of member 280. The displacement of member 280 is proportional to the output quantity $(c)$ and this vertical displacement is converted into a corresponding angular displacement of shaft 273 through rack and pinion arrangement 282. Shaft 273 is then employed to actuate output shaft 176 in accordance with the output quantity $(c)$ which is equal to the product $(ab)$.

Member 280 is arranged to move vertically along the reference line 269, and member 276 is arranged to move vertically along a reference line 283 which last reference line is displaced from reference line 269 by an amount equal to the quantity 2. Thus, the distance of pivot 266 from reference line 283 is equal to the quantity $(2-b)$. The amount that pivot point 281 is displaced from reference line 278 as member 276 is moved is equal to the output quantity $(c)$. Thus, it will be seen that from a consideration of the two symmetrical triangles formed by reference lines 283, 269, 278 and slot 265 the following relationship can be set up.

(9) $$\frac{c}{b} = \frac{2a-c}{2-b}$$

Solving Equation 9 for the output quantity $(c)$ we get the expression:

(10) $$c = ab$$

Thus, it is seen that the apparatus of Fig. 13 operates to produce an angular displacement of output shaft 176 which is equal to the product of the angular displacements of input shafts 261 and 262. Obviously by employing rack and pinion gearing where necessary, either of the inputs or the output could be represented in terms of a linear displacement rather than an angular displacement.

It will be recalled that the predicting circuit 61 of Fig. 5 computes the prediction in any one coordinate by multiplying the target rate in that coordinate by the projectile time of flight. This computation of prediction is therefore based upon the assumption that the linear target rates are all constant during the time of flight of the projectile. In other words, it is assumed that the target flies a constant course at a constant speed during the travel time of the projectile. Obviously, if the target is flying a curved course in a horizontal plane, as is the case when the pilot of the target aircraft has introduced rudder control, this assumption is not valid, and therefore the $x$ and $y$ components of the future position of the target, produced as angular displacements of output shafts 172 and 173 of the predicting circuit 61, will not be correct.

In order to provide corrections to the $x$ and $y$ coordinates of the future position during curved flight of the target, a curvilinear predictor 301 is provided having a course indicator 302 mounted thereon. Curvilinear predictor 301 receives the $x$ and $y$ component target rates $(\dot{x}_0)$ and $(\dot{y}_0)$ from shafts 62 and 63 respectively, and also receives time of flight data from shaft 170. Having received this data, the curvilinear predictor is adapted to provide an indication on the course indicator 302 of the actual course of the target aircraft in the horizontal plane, i. e., it provides an indication of the direction of flight of the target aircraft. If this course indication remains constant, the target must be flying in a constant direction in the horizontal plane. Under these conditions the assumption upon which predicting circuit 61 computes the future position of the target will be valid. However, if a changing course is indicated on the course indicator 302, it will mean that the component target rates are not constant and that the predicting circuit is no longer computing the true future position of the target. Under these conditions an operator can position a switch 303 to its "on" position at which time the curvilinear predictor 301 operates to compute the necessary corrections ($\Delta x$ and $\Delta y$) which must be applied to the $x$ and $y$ components of the future position in order to compensate for the changing direction of flight of the target.

The curvilinear correction $(\Delta x)$ is produced as an angular displacement of output shaft 304 of the curvilinear predictor. Output shaft 304 actuates shaft 305 which is employed as one input to a differential 306, the other input of which is obtained from the $x$ coordinate future position shaft 172. The output member of differential member 306 actuates the true $x$ coordinate future position shaft 7. Similarly, output shaft 307 of curvilinear predictor 301 is actuated in accordance with the future position curvilinear correction $(\Delta y)$. This correction is introduced as one input of the differential 308 through shaft 309 to be there added to the displacement of shaft 173 to produce an output displacement on shaft 8 proportional to the true $y$ coordinate of the future position of the target.

Figure 8:
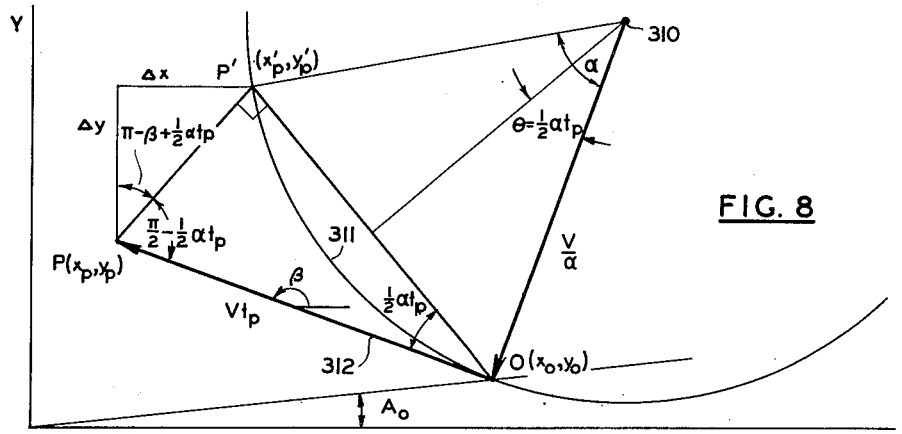
Fig. 8 is a diagram useful in explaining the theory of operation of the curvilinear predictor of Fig. 1.

In Fig. 8 there is shown a geometrical representation useful in obtaining expressions for the curvilinear corrections $\Delta x$ and $\Delta y$. In this figure point (O) represents the projection of the present position of the target on a horizontal plane defined by the $x$ and $y$ reference axes. Point (O) has the coordinates $(x_0, y_0)$. It is assumed that the target is flying at a constant velocity (V) about point 310 at a constant angular velocity $(\alpha)$. Thus, the target is flying in a circular pattern along the circular arc 311, and the instantaneous direction of the target is along tangent line 312 to arc 311 at point (O). This tangent line is shown as having an instantaneous direction at an angle $(\beta)$ with respect to the $x$ reference axis.

During the projectile time of flight $(t_p)$ the target will have traveled a distance $(Vt_p)$. Accordingly, the true future position of the target will be at some point (P') having the coordinates $(x'_p$ and $y'_p)$, point P' being a distance $Vt_p$ along the arc from point O. The future position of the target computed by the differentiating, smoothing and predicting circuit 61, however, would be at some point (P) having coordinates $(x_p$ and $y_p)$, point (P) being along the tangent line 312 at a distance $Vt_p$ from the point O. The distance PP' represents the error between the future position computed by predicting circuit 61 and the true future position of the target $\Delta x$ represents the $x$ component of this error, which must be computed by curvilinear predictor 301 and added to the $x$ component of the future position, as computed by predicting circuit 61. Similarly, $\Delta y$ represents the $y$ component of the error which must be computed by the curvilinear predictor 301.

Since the target is assumed to be flying such as to have a constant angular velocity $(\alpha)$, the angle through which its direction of flight will have turned during the projectile time of flight will be equal to the product $(\alpha t_p)$. Therefore the angle $\theta$ between lines drawn from the point 301 to the point (O) and from the point 301 to the center of the chord connecting points (O) and (P') will be equal to $\frac{1}{2} \alpha t_p$. From the geometry of the figure then it can be seen that the angle POP' is also equal to $\frac{1}{2} \alpha t_p$. It can also be shown that the angle PP'O may be taken as a right angle to a fair degree of approximation. This approximation is particularly true when the rate of turn of the target is small.

Thus, in the right triangle OPP', the line PP' representing the error can be solved for as follows:

(11) $$PP' = Vt_p \sin \tfrac{1}{2} \alpha t_p$$

The angle between the $y$ component $(\Delta y)$ of the error PP' and the line PP' itself can be shown to be equal to $(\pi - \beta + \tfrac{1}{2} t_p)$. Thus, the side $(\Delta x)$ of the triangle formed by $\Delta x$ and $\Delta y$ and PP' can be solved for as follows:

(12) $$\Delta x = Vt_p \sin \tfrac{1}{2} \alpha t_p \sin (\pi - \beta + \tfrac{1}{2} \alpha t_p)$$

which reduces to:

(13) $$\Delta x = Vt_p \sin \tfrac{1}{2} \alpha t_p \sin (\beta - \tfrac{1}{2} \alpha t_p)$$

Similarly, the side $(\Delta y)$ of this triangle can be solved for as follows:

(14) $$\Delta y = Vt_p \sin \tfrac{1}{2} \alpha t_p \cos (\pi - \beta + \tfrac{1}{2} \alpha t_p)$$

which reduces to:

(15) $$\Delta y = Vt_p \sin \tfrac{1}{2} \alpha t_p \cos (\beta - \tfrac{1}{2} \alpha t_p)$$

Thus, we have expressions for the curvilinear corrections ($\Delta x$ and $\Delta y$), which must be added to the $x$ and $y$ coordinates of the future position of the target, computed by the predicting circuit 61, in order to correct these future position coordinates, when the target is flying at a constant angular rate with a constant velocity.

Figure 9:
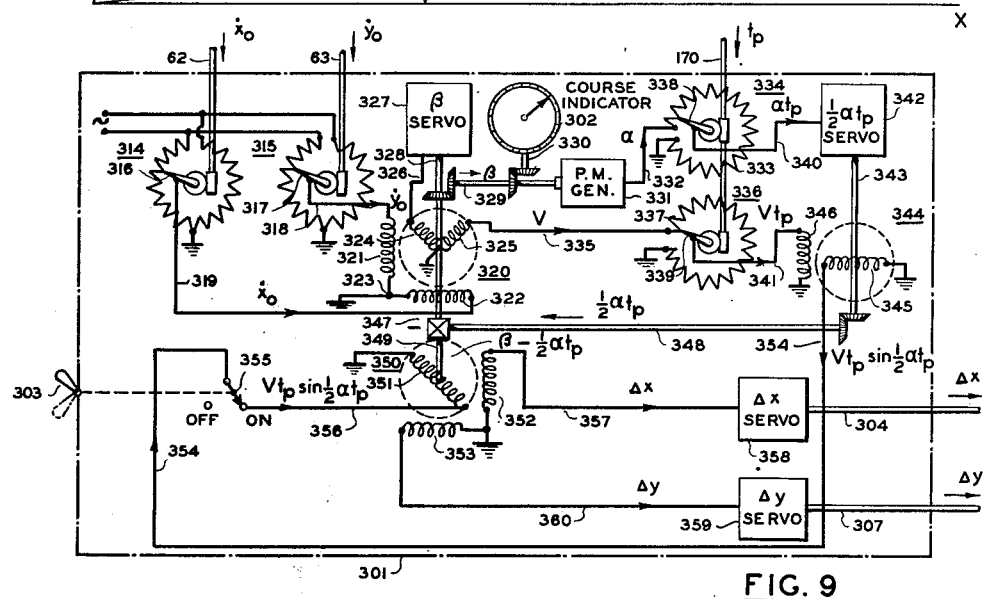
Fig. 9 is a schematic and wiring diagram of the curvilinear predictor of Fig. 1.

Suitable apparatus for computing these curvilinear corrections ($\Delta x$ and $\Delta y$) is shown in Fig. 9. As there shown, two linearly wound potentiometer units 314 and 315, are provided, each having their resistive winding actuated from a constant source of alternating potential and each having a midpoint on their resistive winding grounded. The movable contact arm 316 of potentiometer 314 is actuated in accordance with the $x$ coordinate of the target rate from input shaft 62, and the movable contact arm 317 of potentiometer unit 315 is actuated in accordance with the $y$ coordinate of the target rate from input shaft 63. Accordingly there is produced upon output lead 318, which is electrically connected to contact arm 317, an alternating potential corresponding in magnitude and phase to the $y$ coordinate of the target rate. There is similarly produced on output lead 319, which is electrically connected to contact arm 316, an alternating potential corresponding in magnitude and phase to the $x$ coordinate of the target rate.

A rotary transformer 320 having two stator windings 321 and 322 arranged in spaced quadrature is provided. Windings 321 and 322 are connected together at a point 323 which is grounded. The other terminal of winding 321 is connected to lead 318 so that this winding is energized in accordance with $\dot{y}_0$. The other terminal of winding 322 is energized from lead 319 so that this winding is energized in accordance with $\dot{x}_0$. Winding 322 will therefore produce a magnetic flux in rotary transformer 320 proportional to the target rate in the $x$ direction. Winding 321 will produce a magnetic flux, in a direction at right angles to the flux produced by winding 322, proportional to the target rate in the $y$ direction. These two magnetic fluxes will be superimposed upon each other, and will combine to produce a resultant magnetic flux in rotary transformer 320 having a magnitude corresponding to the target velocity (V) and a direction and phase corresponding to the angle ($\beta$) that the direction of target flight makes with respect to the $x$ reference axis.

The rotor of rotary transformer 320 has two rotor windings 324 and 325 also arranged in spaced quadrature with respect to each other and also having a common terminal grounded. The potential induced in rotor winding 324 is transmitted as by lead 326 to the course ($\beta$) servo 327 where it is employed as an input signal to actuate the servo.

Servo 327 is of any suitable type adapted to produce an angular displacement of output shaft 328 at a rate proportional to its input signal. Shaft 328 is connected to actuate the rotor of rotary transformer 320 in such a direction as to reduce the potential induced in winding 324, and thereby reduce the course servo signal appearing on lead 326 to zero. Accordingly, should rotor winding 324 not be positioned at right angles with respect to the magnetic flux induced in rotary transformer 320 by stator windings 321 and 322, a voltage signal will be generated in winding 324 which will actuate servo 327 and shaft 328 until rotor winding 324 is at right angles to this flux. Thus, it is seen that shaft 328 will at all times have an angular displacement corresponding to the direction of the flux in rotary transformer 320, and therefore corresponding to the course ($\beta$) of the target.

The angular displacement of shaft 328, representing the course ($\beta$) of the target, is employed to actuate the course indicator 302 through shafts 329, 330, and the interconnecting gearing. Thus, there is always provided an indication of the actual direction of flight of the target.

Also actuated in accordance with the target course from shaft 328 and 329 is a permanent magnet generator 331, which may be of any suitable type adapted to produce upon its output lead 332 a direct voltage having a magnitude and polarity corresponding to the angular rate at which it is actuated. Thus, the voltage produced on output lead 332 is proportional to the rate of change ($\alpha$) of target course ($\beta$). Lead 332 is connected to one terminal of the resistive winding 333 of a linearly wound potentiometer 334, the other terminal of which is connected to ground.

Referring back to the rotary transformer 320, it will be recalled that through the action of the course servo 327, winding 324 was maintained at right angles with respect to the magnetic flux existing in the transformer. Accordingly, since rotor windings 324 and 325 are positioned at right angles with respect to each other, winding 325 is always coincident with the resultant magnetic flux in the transformer. Thus, there will be induced in winding 325 an alternating potential having a magnitude and phase corresponding to the target velocity (V) since the resultant magnetic flux in rotary transformer 320 was previously shown to correspond to this target velocity. This alternating potential, induced in winding 325 and corresponding to the target velocity (V), is transmitted as by lead 335 to a potentiometer unit 336 where it is employed to energize a resistive winding 337.

The movable contact arms 338 and 339 of potentiometer units 334 and 336 are both actuated in accordance with time of flight ($t_p$) from input shaft 170. Thus, there will be produced upon lead 340, which is electrically connected to contact arm 338 of potentiometer unit 334, a direct voltage proportional to the product ($\alpha t_p$). Similarly, there will be produced upon output lead 341, which is electrically connected to contact arm 339 of potentiometer unit 336, an alternating potential proportional to the product ($V t_p$).

The direct voltage existing on lead 340 is employed as the actuating signal for the $\frac{1}{2}\alpha t_p$ servo 342. In this case servo 342 is of the type adapted to produce an angular displacement of its output shaft 343 proportional to the input signal received on lead 345. Accordingly, output shaft 343 is angularly displaced by an amount proportional to $\alpha t_p$. The proportionality factor existing in servo 342 is made by design equal to $\frac{1}{2}$ so that the angular displacement of shaft 343 represents the quantity $\frac{1}{2}\alpha t_p$. This shaft is employed to actuate the rotor of a rotary transformer 344. Rotary transformer 344 is provided with a rotor winding 345 and a stator winding 346. Stator winding 346 is energized in accordance with the product ($V t_p$) from lead 341. Accordingly, there will be induced in rotor winding 345 an alternating potential corresponding to the quantity ($V t_p \sin \frac{1}{2}\alpha t_p$).

The angular displacement of shaft 343, representing the quantity $\frac{1}{2}\alpha t_p$, is employed to actuate one input member of a subtracting differential 347 through shaft 348. The other input member of differential 347 is actuated in accordance with the target course ($\beta$) from shaft 328. The output member of differential 347, therefore, actuates shafts 349 in accordance with the quantity ($\beta - \frac{1}{2}\alpha t_p$). Shaft 349 in turn actuates the rotor of a rotary transformer 350 having one rotor winding 351 and two stator windings 352 and 353.

Rotor winding 351 of rotary transformer 350 is energized from the potential induced in rotor winding 345 of rotary transformer 344, which potential is transmitted on lead 354 through on-off switch 355 and then on lead 356 to one terminal of rotary winding 351, the other terminal thereof being connected to ground. Switch 355 is schematically indicated as being positioned from external on-off switch 303.

Stator windings 352 and 353 of rotary transformer 350 are arranged at right angles with respect to each other and have a common terminal grounded. The alternating potential induced in stator winding 352 will be proportional to the alternating potential ($V t_p \sin \frac{1}{2}\alpha t_p$) applied across rotor winding 351 and will also be proportional to the sine of the angle ($\beta - \frac{1}{2}\alpha t_p$) through which the rotor winding 351 is rotated from shaft 349. Thus, the voltage on output lead 357, which is electrically connected to one terminal of winding 352, will be proportional to the quantity $$[V t_p \sin \tfrac{1}{2}\alpha t_p \sin (\beta - \tfrac{1}{2}\alpha t_p)]$$

and will therefore be proportional to the $x$ curvilinear correction ($\Delta x$) in accordance with Equation 13. This alternating potential is applied as the input signal to the $\Delta x$ servo 358 which is of the type adapted to produce an angular displacement of its output shaft 304 proportional to the input signal received on input lead 357. Thus, output shaft 304 is angularly displaced an amount proportional to $\Delta x$ as required.

In a similar manner the voltage induced in stator winding 353 and transmitted to the $\Delta y$ servo 359 on lead 360 is proportional to the quantity $$[V t_p \sin \tfrac{1}{2}\alpha t_p \cos (\beta - \tfrac{1}{2}\alpha t_p)]$$

and is therefore proportional to the $y$ curvilinear correction ($\Delta y$), as derived in Equation 15. The $\Delta y$ servo 359 is of the same type as the $\Delta x$ servo 358, and therefore operates to transform the $\Delta y$ voltage signal appearing on lead 360 into a corresponding angular displacement signal appearing on output shaft 307. Thus, the angular displacement of output shaft 307 is proportional to the y curvilinear correction Δy as required.

The operator of the director, by observing the course indicator 302, will be able to ascertain whether the target is flying in a constant direction or whether it is changing its course appreciably. If the latter condition is true, the operator can place switch 303 in its "on" position whereupon the curvilinear predictor 301 will operate to compensate the x and y coordinates of the future position of the target, as computed by the predicting circuit 61, by the curvilinear corrections Δx and Δy, respectively. In this way shafts 7 and 8 will be angularly displaced amounts respectively corresponding to the x and y components of the true future position of the target with the target's changing course taken into account.

Figure 10:
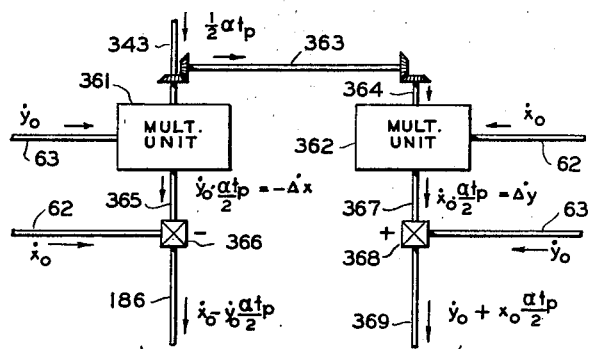
Fig. 10 is a modified form of Fig. 9.

There is shown in Fig. 10 alternate apparatus for taking into account a changing target course. This apparatus operates under a somewhat different principle than that shown in Fig. 9. In this case, instead of compensating the rectangular coordinates of the future position of the target to take into account changing target course, the target rates computed and employed in the differentiating, smoothing, and predicting circuit 61 are compensated.

Since the velocity of the target in a horizontal plane is the resultant of its component velocities in the y and x directions, respectively, the target course (β) may be expressed as follows:

(16) $$\beta = \text{arc tan} \frac{\dot{y}_0}{\dot{x}_0}$$

The angular rate of change (α) of the target course (β) may then be obtained by differentiating Equation 16. Thus, we obtain the expression:

(17) $$\alpha = \frac{\dot{x}_0 \ddot{y}_0 - \dot{y}_0 \ddot{x}_0}{\dot{x}_0^2 + \dot{y}_0^2}$$

wherein the double dots represent the second derivative of the quantities over which they are placed. Also, the relation between the target velocity V and the component target rates may be written as follows:

(18) $$\dot{x}_0^2 + \dot{y}_0^2 = V^2$$

Differentiating Equation 18, and assuming that the target velocity (V) is constant, we obtain:

(19) $$\dot{x}_0 \ddot{x}_0 + \dot{y}_0 \ddot{y}_0 = 0$$

Substituting the left-hand side of Equation 18 in Equation 17, and rewriting the equation, we obtain the expressions:

(20) $$\dot{x}_0 \ddot{y}_0 - \dot{y}_0 \ddot{x}_0 = \alpha V^2$$

Solving Equations 19 and 20 for $\ddot{x}_0$ and $\ddot{y}_0$, we obtain:

(21) $$\ddot{x}_0 = -\dot{y}_0 \alpha$$

(22) $$\ddot{y}_0 = \dot{x}_0 \alpha$$

From Equations 21 and 22 it is apparent that a target having a changing course is accelerating in the x and y directions. These accelerations are not taken into account in predicting circuit 61 in computing the x and y coordinates of the future position of the targets. The resulting errors (Δx and Δy) in these future position coordinates due to these accelerations can be obtained to a fair degree of approximation as follows:

(23) $$\Delta x = \tfrac{1}{2} \ddot{x}_0 t_p^2$$

(24) $$\Delta y = \tfrac{1}{2} \ddot{y}_0 t_p^2$$

Substituting the values of $\ddot{x}_0$ and $\ddot{y}_0$ given by Equations 21 and 22 in Equations 23 and 24, we obtain

(25) $$\Delta x = -\alpha \dot{y}_0 \frac{t_p^2}{2}$$

(26) $$\Delta y = \alpha \dot{x}_0 \frac{t_p^2}{2}$$

Instead of solving for these values of curvilinear corrections Δx and Δy and applying them as corrections to the future position coordinates computed by prediction circuit 61, in the embodiment of the curvilinear prediction apparatus of Fig. 10 we prefer to solve for corresponding curvilinear rate corrections (Δẋ and Δẏ) which, when added to the target rates (ẋ₀ and ẏ₀), will accomplish the same result. Since the target rates are multiplied by time of flight ($t_p$) in predicting circuit 6 to get the future position coordinates, it will be apparent that proper curvilinear rate corrections (Δẋ and Δẏ) can be obtained by dividing the values of Δx and Δy given in Equations 25 and 26 by $t_p$. Performing this division, we obtain

(27) $$\Delta \dot{x} = -\alpha \dot{y}_0 \frac{t_p}{2}$$

(28) $$\Delta \dot{y} = \alpha \dot{x}_0 \frac{t_p}{2}$$

Referring now to Fig. 10, wherein apparatus for obtaining these curvilinear rate corrections (Δẋ and Δẏ) is shown, it will be understood that that portion of the apparatus of Fig. 9 which is required in order to obtain an angular displacement of shaft 343 proportional to the quantity ½α$t_p$ is to be employed. This quantity is introduced into a multiplying unit 361 directly from input shaft 343, and into a second multiplying unit 362 from shaft 343 by way of shafts 363 and 364 and the interconnecting gearing.

Multiplying unit 361, having also received as its second input the y coordinate of target rate (ẏ₀) from input shaft 63, produces the product $$\left( \dot{y}_0 \alpha \frac{t_p}{2} \right)$$

as a proportional rotation of its output shaft 365. This quantity then is the negative of the required curvilinear rate correction (Δẋ), as derived in Equation 27. Accordingly, a subtracting differential 366 is provided wherein the quantity $$\left( \dot{y}_0 \alpha \frac{t_p}{2} \right)$$

appearing as a proportional angular displacement of shaft 365, is subtracted from the x target rate (ẋ₀), appearing as a proportional angular displacement of input shaft 62. The angular displacement of output shaft 186′ of differential 366 is then proportional to the true target rate (ẋ₀) compensated for the changing course of the target. Shaft 186′ is then introduced into the multiplying unit 187 of predictor 61 in place of shaft 186.

In a similar manner, the product of the quantity ½α$t_p$ and the x coordinate of target rate (ẋ₀) is obtained as a proportional rotation of output shaft 367 of multiplying unit 362, the ẋ₀ input of which is received on shaft 62. This product $$\dot{x}_0 \alpha \frac{t_p}{2}$$

then represents the curvilinear rate correction (Δẏ) in accordance with Equation 28. A differential 368 is provided which in this case operates to add the y rate correction (Δẏ) to the ẏ rate (ẏ₀). Thus, there is produced an angular displacement of output shaft 369 proportional to the true target rate (ẏ₀) compensated for the curved flight of the target. This compensated rate appearing as shaft 369 may then be used as the rate input shaft to the multiplier in predicting circuit 61, which multiplies target rate in the y direction by time of flight in order to get the y component of prediction.

A course indicator and an on-off switching arrangement similar to those shown in Fig. 9 may obviously be employed with the alternate form of curvilinear predictor illustrated in Fig. 10.

The ultimate result of all of the director apparatus thus far described is to compute the future position rectangular coordinates $x_p$, $y_p$, and $z_p$ as proportional angular displacements of shafts 7, 8, and 9, respectively. It will be recalled that the final function of the director apparatus was stated to be to employ this future position data to compute angle of train and quadrant elevation data for positioning the guns, time of flight data to be fed back into the predicting circuit, and fuze data for cutting the projectile. The apparatus provided for this final function will now be described.

Referring to Fig. 1, angle of train shaft 10, quadrant elevation shaft 11, and time of flight shaft 13 are shown actuated respectively by angle of train servo 381, quadrant elevation servo 382, and time of flight servo 383. In general, it may be said that this quadrant elevation, angle of train, and time of flight data determined a particular position at which the projectile will burst. This point will be referred to as the shell burst position and its coordinates will be primed to distinguish from the unprimed coordinates of the future position of the target. In general, the operation of the remaining portion of the director apparatus is essentially to compute from the angle of train, quadrant elevation, and time of flight, appearing on shafts 10, 11 and 13, respectively, the corresponding rectangular coordinates $x'_p$ and $y'_p$ and $z'_p$ of the shell burst position; to compare the shell burst coordinates with the future position coordinates; and from this comparison to derive voltage signals for actuating servos 381, 382 and 383 to reposition shafts 10, 11 and 13, respectively, until the shell burst position coincides with the computed future position. When these two positions coincide it will be apparent that shafts 10, 11 and 13 are correctly set to effect a hit upon the target.

As an intermediate step in the above-mentioned process an $R_p$ servo 384 actuates an $R_p$ shaft 385 through shafts 386, 387, and the interconnecting gearing. The angular displacement of shaft 385, corresponding to the future horizontal range ($R_p$), is provided as an input to the difference indicator and converter 388, and also as an input to the rectilinear converter 389. The angle of train, appearing as a proportional rotation of shaft 10, is employed to actuate one input member of a differential 390, as by way of shaft 391. Another input member of differential 390 is actuated in accordance with drift ($\delta$) from shaft 392. Shaft 392 is actuated from the time of flight shaft 13 through shaft 393 and the interconnecting gearing. Thus drift is taken as proportional to time of flight. In differential 390 the drift, received on shaft 392, is subtracted from the angle of train, received on 391, to produce, as a proportional rotation of output shaft 394, the azimuth coordinate $A'_p$ of the shell burst position, and this quantity is also introduced into rectilinear converter 389.

In rectilinear converter 389 the shell burst azimuth ($A'_p$) and the future horizontal range ($R_p$) are trigonometrically combined to produce an angular displacement of output shafts 395 and 396 proportional to the $x$ and $y$ coordinates ($x'_p$ and $y'_p$), respectively, of the shell burst position which is determined by the positions of future horizontal range shaft 385 and shell burst azimuth shaft 394. This may be accomplished in rectilinear converter 389 by apparatus identical to that described with respect to rectilinear converter 34 for obtaining $x_0$ and $y_0$ from $A_0$ and $R_0$.

The $x$ and $y$ coordinates of the shell burst position, appearing as angular rotations of shafts 395 and 396, are introduced into the difference indicator and converter 388 where they are subtracted from the $x$ and $y$ coordinates of the future position of the targets received on shafts 7 and 8, respectively. The resulting differences ($dx$ and $dy$), which are obtained from this subtraction, may be considered as error signals indicating the error between the shell burst position in the horizontal plane determined by the angular displacements of angle of train shaft 10 and future horizontal range shaft 385, and the future position defined by the angular displacements of the $x_p$ shaft 7 and the $y_p$ shaft 8.

These error signals ($dx$ and $dy$) are then converted into suitable signals ($dAT$ and $dR_p$), as will later be described in detail, for operating the angle of train servo 381 and the $R_p$ servo 384. In order to accomplish this conversion, angle of train (A. T.) must also be received in the difference indicator 388 from the angle of train servo 381 through shafts 505 and 504. The angle of train error signal ($dAT$) is transmitted from the difference indicator and converter 388 to the angle of train servo 381, as on lead 397, and the range error signal ($dR_p$) is transmitted to the $R_p$ servo 384, as on lead 398. Servos 381 and 384, and also servos 382 and 383, are of any suitable type adapted to produce an angular displacement of their output shafts at a rate proportional to the input signal voltage. Thus it will be apparent that angle of train shaft 10 and future range shaft 385 will continue to be driven by their respective servos until the shell burst position determined thereby coincides in the horizontal plane with the computed future position of the target, at which time the error signals will be reduced to zero and no further motion of these shafts will take place.

In a similar manner the angular position of quadrant elevation shaft 11 and time of flight shaft 13, determined a horizontal range coordinate ($R'_p$) and an altitude coordinate ($z'_p$) of the corresponding shell burst position. These range and altitude coordinates of the shell burst position are obtained as angular displacements of shafts 399 and 402, respectively, from shafts 11 and 13, in suitable ballistic apparatus consisting essentially of primary ballistic corrector 400, and secondary ballistic corrector 401. The angular positions of shell burst range and altitude shafts 399 and 402 are compared in the difference indicator and converter 388 with the angular positions of future position horizontal range and altitude shafts 385 and 9, respectively, and the differences, if any, are modified to produce on output leads 403 and 404 suitable signal voltages ($dt_p$ and $dQE$) for operating the time of flight and quadrant elevation servos 383 and 382, respectively. In order to effect this modification quadrant elevation and time of flight are received in the difference indicator and converter on shafts 244 and 247, respectively. Servos 383 and 382 will continue to operate until the position of shafts 11 and 13 determine a shell burst position having range and altitude coordinates coincident with the range and altitude coordinates of the computed future position.

Time of flight ($t_p$) is introduced into the primary ballistic corrector 400 from shaft 13 through shaft 405. Similarly, quadrant elevation (Q. E.) is introduced into the primary ballistic corrector 400 from shaft 11 through shaft 406. The primary ballistic corrector, which will later be described in detail, is adapted to produce on its output shafts 407 and 408 the range ($R_1$) and altitude ($z_1$) of the corresponding shell burst position under predetermined standard atmospheric conditions and a predetermined standard muzzle velocity. Shafts 407 and 408 are then employed to displace the input members of differentials 409 and 410, respectively.

The secondary ballistic corrector 401 receives time of flight ($t_p$) on shaft 393 from shaft 13, and quadrant elevation (Q. E.) on shaft 411 from shaft 11. Shell burst horizontal range ($R_1$) under standard conditions is also received from shaft 407 through shafts 455, 454 and 437. There is also set into a secondary ballistic corrector 401 data corresponding to the change in muzzle velocity ($\Delta mv$) from the predetermined standard and the percent change in ballistic air density (percent $\Delta \rho a$), as on knobs 412 and 413, respectively.

The secondary ballistic corrector 401, having received this information, is adapted to produce upon output shaft 414 an angular displacement corresponding to the correction ($z_2$) which must be applied to the shell burst altitude ($z_1$), appearing on shaft 408, to compensate it for the existing variations in the muzzle velocity and ballistic air density from standard. Similarly, there is produced upon output shaft 415 an angular displacement proportional to the range correction ($R_2$) which must be applied to the shell burst range ($R_1$), existing on shaft 407, in order to compensate it for variations in muzzle velocity and ballistic air density.

The altitude correction ($z_2$) is transmitted, as by shafts 414 and 416, to the differential 410, wherein it is added to the shell burst altitude ($z_1$), received on shaft 408, to produce on output shaft 417 an angular displacement corresponding to the true altitude ($z'_p$) of the shell burst position. Shaft 417 actuates the shell burst altitude shaft 402 through suitable gearing. In a similar way the range correction ($R_2$), appearing on shaft 415, is combined in differential 409 with the shell burst range ($R_1$) under standard conditions to produce an angular displacement of output shaft 418 proportional to the true horizontal range ($R'_p$) of the shell burst position under actual conditions.

The secondary ballistic corrector 401 is also adapted to compute the fuze correction ($\Delta f$) which must be added to a quantity proportional to time of flight in order to obtain the ballistic fuze data ($F_b$). This fuze correction ($\Delta f$) is produced as an angular displacement of output shaft 419, which shaft actuates one input of differential 420. The other input of differential 420 is actuated proportionately to the time of flight from shaft 393 through shaft 421. The angular displacement of the output shaft 422 of differential 420 therefore, is proportional to the ballistic fuze ($F_b$) and this quantity is introduced into the fuze corrector 423.

Fuze corrector 423 is provided with a percent fuze correction knob 424 which may be set in an arbitrary manner to introduce an arbitrary percentage correction into the fuze data (Fb) received on shaft 422. There is also provided a fuze dead time knob 425 in order to set fuze dead time data (F. D. T.) into the fuze converter 423. The fuze converter 423, as will later be described in detail, is adapted to predict what value the received ballistic fuze data will have after an interval equal to the fuze dead time and to produce this predicted fuze data (F) as a proportional angular displacement of shaft 12. Shaft 12 is then employed to actuate a fuze transmitter 426 which may be of any conventional type, such as a Selsyn, which transforms the fuze data received as an angular displacement of shaft 12 into a suitable electrical signal, appearing on output lead 3, for transmission to the guns.

Similarly, transmitters 427 and 428 are provided, respectively, actuated by angle of train shaft 10 and quadrant elevation shaft 11 in order to produce electrical signals on output leads 1 and 2 corresponding to the angle of train and quadrant elevation data required at the guns.

Figure 11:
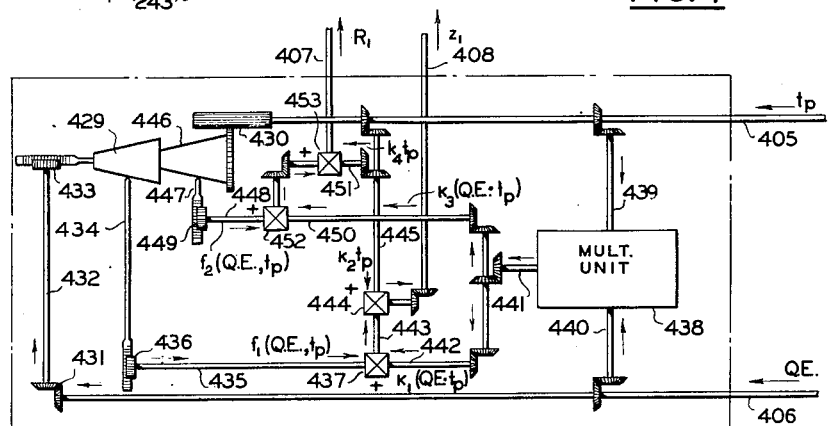
Fig. 11 is a more detailed schematic drawing of the primary ballistic corrector of Fig. 1.

Referring now to the primary ballistic corrector 400, shown in Fig. 11, it will be recalled that the purpose of this apparatus is to produce angular displacements of output shafts 407 and 408 corresponding to the range ($R_1$) and altitude ($z_1$) of the shell burst position determined by the time of flight and quadrant elevation data received on shafts 405 and 406, respectively, under standard atmospheric conditions and standard muzzle velocity. It has been found that the altitude ($z_1$) can be expressed as a function of quadrant elevation and time of flight by the following formula:

(29) $\quad z_1 = K_1 Q.E. \cdot t_p + K_2 t_p + f_1(Q.E., t_p)$

In order to solve for the quantity $f_1(O.E., t_p)$ a three-dimensional cam 429 is provided. Three-dimensional cam 429 is rotated in accordance with the time of flight from shaft 405 through gearing 430, and is laterally displaced in accordance with quadrant elevation from shaft 406 through gearing 431, shaft 432, and rack and pinion arrangement 433. Accordingly, by proper design of cam 429, the cam follower 434 may be displaced in accordance with the required function ($f_1$) of quadrant elevation and time of flight. The displacement of follower 434 is converted into a corresponding angular displacement of shaft 435 through rack and pinion gearing 436. The displacement of shaft 435, representing the quantity $f_1(OE, t_p)$ is employed to actuate one input member of a differential 437.

In order to obtain the quantity $K_1(OE \cdot t_p)$, a multiplying unit 438, which may be of any suitable type, is provided. Time of flight data is introduced into multiplying unit 438 from shaft 405 through shaft 439, and quadrant elevation data is introduced from shaft 406 through shaft 440. The angular displacement of output shaft 441 is thus proportional to the product $(OE \cdot t_p)$. Shaft 441 is then employed to actuate shaft 442 through suitable interconnecting shafts and gearing, the proportionality factor of which gearing is designed such that the angular displacement of shaft 442 represents the quantity $(K_1OE \cdot t_p)$. Differential 437 operates to additively combine the displacements of its two input shafts 435 and 442, to thereby produce upon its output shaft 443 an angular displacement proportional to the sum $K_1QE \cdot t_p + f_1(OE, t_p)$, and this sum is introduced into the differential 444 as an angular displacement of input shaft 443. Also introduced into differential 444, as an angular displacement of input shaft 445 which is actuated by time of flight shaft 405, is the remaining quantity ($K_2 t_p$) in the expression for $z_1$ given in Equation 31.

Differential 444 operates to obtain the sum of its two inputs. There is thus produced upon output shaft 408, which is actuated in accordance with the output member of differential 444, an angular displacement proportional to the quantity $K_1 QE \cdot t_p + K_2 t_p + f_1(QE, t_p)$. As indicated in Equation 29, the angular displacement of output shaft 408 therefore is proportional to the altitude coordinate ($z_1$) of the shell burst position under standard conditions.

The range coordinate $R_1$ of the shell burst position corresponding to the positions of shafts 405 and 406 is also determined in primary ballistic corrector 400 for standard conditions. This range coordinate ($R_1$) may be expressed in terms of the quadrant elevation and time of flight by the following expression:

(30) $\quad R_1 = K_3 QE \cdot t_p + K_4 t_p + f_2(QE, t_p)$

Equation 30 is solved for in a manner very similar to that in which Equation 29 was solved. Thus, three dimensional cam 446, which is rotated and laterally displaced in accordance with time of flight and quadrant elevation, respectively, is designed so as to produce a lateral displacement of its follower 447, corresponding to the quantity $f_2(QE, t_p)$. The lateral displacement of follower 447 is converted into a corresponding angular displacement of shaft 448 by the rack and pinion gearing 449. The quantity $K_3(QE \cdot t_p)$ is obtained as a proportional rotation of shaft 450 from shaft 441 through the interconnecting shafts and gearing. The other quantity ($K_4 t_p$) in the expression for $R_1$ is obtained as an angular displacement of shaft 451 from shaft 445 through the proper ratio gearing.

The angular displacements of shafts 448, 450 and 451 are additively combined in differentials 452 and 453 to thereby produce an angular displacement of the output shaft 407 of the final differential 453 proportional to the sum of these three shaft displacements, and therefore proportional to the quantity $$K_3 QE \cdot t_p + K_4 t_p + f_2(QE, t_p)$$

Thus the angular displacement of shaft 407 represents the range coordinate ($R_1$) of the shell burst position under standard conditions in accordance with Equation 30.

Figure 12:
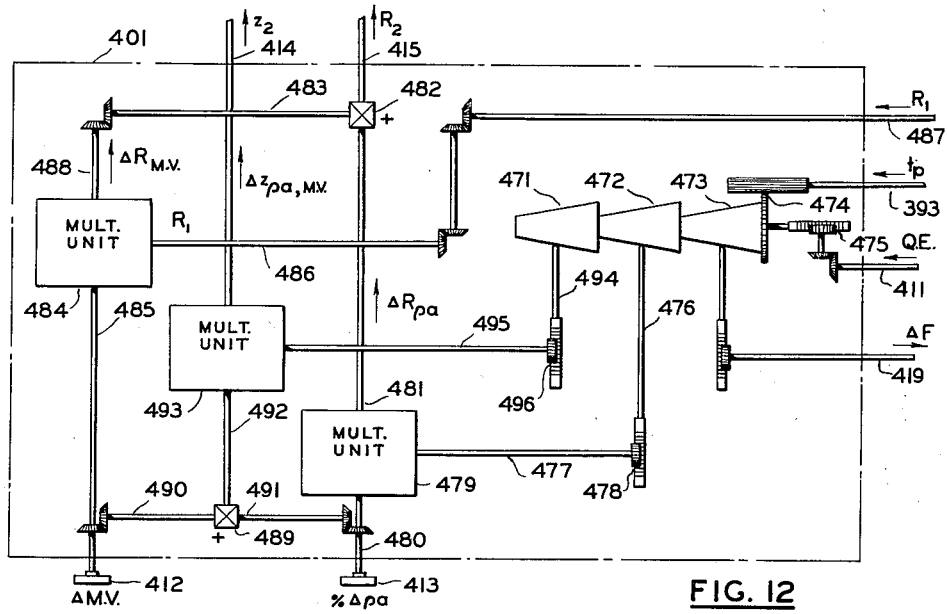
Fig. 12 is a more detailed schematic drawing of the secondary ballistic corrector of Fig. 1.

Referring now to Fig. 12, wherein the secondary ballistic corrector is shown, a series of three 3-dimensional cams 471, 472, and 473 are all angularly displaced in accordance with time of flight from shaft 393 through gearing 474, and are all lateraly displaced in accordance with quadrant elevation from shaft 411 through suitable shafts and gearing including rack and pinion gearing 475. Three-dimensional cam 472 is so laid out that the displacement of its follower 476 represents the change in horizontal range corresponding to a unit percentage change in ballistic air density as obtained from the applicable ballistic firing tables. The displacement of follower 476 is converted into a corresponding angular displacement of shaft 477 through rack and pinion gearing 478, and is employed as one input to multiplying unit 479. Shaft 480, which provides the other input to multiplying unit 479, is angularly displaced an amount proportional to the actual existing percentage change in ballistic air density from standard air density, this percentage change having been set in on knob 413.

Multiplying unit 479 may be of the type previously disclosed and described with respect to Fig. 13, and therefore produces, as an angular displacement of its output shaft 481, the actual change in horizontal range ($\Delta R_{\rho a}$) corresponding to the variation in existing air density from standard.

This shaft 481 provides one input to an additive differential 482, the other input of which is provided by shaft 483, which is angularly displaced an amount proportional to the change in horizontal range ($\Delta R_{mv}$) corresponding to the actual variation in muzzle velocity from standard. Accordingly, there is produced upon output shaft 415 an angular displacement proportional to the total change in horizontal range ($R_2$) corresponding to the existing variations in air density and muzzle velocity from standard.

In order to obtain the component of the total change of horizontal range ($\Delta R_{mv}$), which is due to variations in muzzle velocity from standard, multiplying unit 484 is provided having one input received from shaft 485, which shaft is actuated from knob 412 in accordance with the existing change ($\Delta_{mv}$) in muzzle velocity from standard. The other input to multiplying unit is obtained from shaft 486, which is driven through interconnecting shafts and gearing from input shaft 487, which is actuated in accordance with the horizontal range ($R_1$) of the shell burst position under standard conditions. It has been found that this quantity ($R_1$) is proportional to the change in horizontal range corresponding to a unit change in muzzle velocity from standard. Accordingly, there is produced upon output shaft 488 of multiplying unit 484 an angular displacement proportional to the total change in range ($\Delta R_{mv}$) corresponding to the existing variation of muzzle velocity from standard.

Shaft 488 then actuates shaft 483 through suitable gearing to introduce this quantity into differential 482.

It has been found that the changes in altitude brought about by variations in ballistic air density and the changes in altitude brought about by variations in muzzle velocity are so closely related that the total change in altitude ($z_2$) corresponding to the actual variations in air density and muzzle velocity from standard conditions may be obtained by obtaining a change in altitude per unit equivalent combined variation in both muzzle velocity and percent air density from standard, and multiplying this quantity by the actual combined equivalent variation existing. Thus, a differential 489 is provided having one input driven in accordance with the variation of muzzle velocity ($\Delta mv$) from shaft 485 and shaft 490, and a second input driven in accordance with percentage change in air density (percent $\Delta pa$) from shaft 480 and shaft 491.

Differential 489 operates to additively combine these two inputs to thereby produce as an angular displacement of shaft 492 the combined equivalent variation from a normal muzzle velocity and a normal air density. Shaft 492 supplies one input to multiplying unit 493.

Three-dimensional cam 471 is so designed that its follower 494 is laterally displaced an amount corresponding to the change in altitude corresponding to a unit combined equivalent variation in both muzzle velocity and air density. The linear displacement of follower 494 is transformed into a corresponding angular displacement of shaft 495 through rack and pinion 496, and this angular displacement of shaft 495 supplies the other input to multiplying unit 493.

Multiplying unit 493 operates to obtain the product of the change in altitude per unit combined equivalent variation in muzzle velocity and air density, received on shaft 495, and the actual existing combined variation received on shaft 492, and to produce this product as an angular displacement of output shaft 414. The displacement of shaft 414 therefore represents the actual change in altitude ($z_2$) corresponding to the actual existing variations in muzzle velocity and air density from standard.

Figure 14:
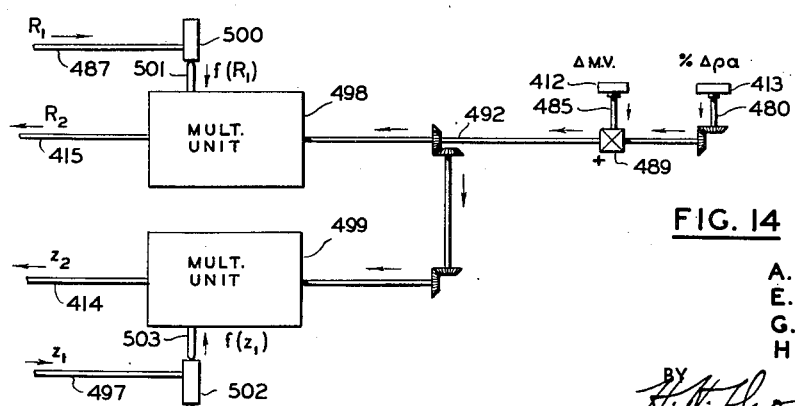
Fig. 14 is a schematic drawing of an alternate form of secondary ballistic corrector.

In Fig. 14 there is shown a different and perhaps simpler secondary ballistic corrector for obtaining the range and altitude corrections ($R_2$) and ($z_2$) corresponding to the actual variations in muzzle velocity and air density from the predetermined standards upon which the applicable ballistic firing tables were based. In this modification it is required not only that an input displacement corresponding to the shell burst range ($R_1$) under standard conditions be received, as in the secondary ballistic corrector of Fig. 12 but also that an input displacement proportional to the shell burst altitude ($z_1$) under standard conditions be received. The shell burst altitude ($z_1$) is indicated as received as an angular displacement of input shaft 497. This shaft could be actuated from output shaft 408 of the primary ballistic corrector 400. The quantity ($R_1$) is received, as before, as a corresponding angular displacement of input shaft 487.

As was the case in obtaining the altitude correction ($z_2$) in the apparatus of Fig. 12, the change in muzzle velocity ($\Delta mv$) set in on knob 413, and the percentage change in air density ($\Delta pa$), set in on knob 413, are combined in a differential 489 to produce an angular displacement of the output shaft 492 proportional to a combined equivalent change in both muzzle velocity and air density from standard conditions. This combined equivalent change, which may be thought of either as an equivalent change in muzzle velocity or as an equivalent change in air density, is introduced as one input to multiplying units 498 and 499, respectively.

A flat cam 500 is actuated in accordance with the shell burst horizontal range ($R_1$) under standard conditions from shaft 487. This cam is so designed that its follower 501 is thereby displaced an amount corresponding to the change in horizontal range per unit combined equivalent variation in muzzle velocity and air density from standard. It has been found that this quantity can be obtained as a function of $R_1$. The multiplying unit operates to obtain the product of the change in horizontal range per unit equivalent combined variation in muzzle velocity and air density, received as a lateral displacement of follower 501, and the actual existing number of units of combined equivalent variation in muzzle velocity and air density from standard, and to produce this product as the required total change in horizontal range ($R_2$) as an angular displacement of output shaft 415. It will be understood that multiplying unit 498 includes suitable rack and pinion gearing to convert the lateral displacement of follower 501 into a corresponding angular displacement.

In a similar manner a flat cam 502 is actuated in accordance with the quantity ($z_1$) from input shaft 497, and is so designed as to produce a lateral displacement of its follower 503 corresponding to the change in altitude per unit equivalent combined variation in muzzle velocity and air density from standard. This quantity is then multiplied in multiplying unit 499 by the actual existing number of units of combined equivalent variation in muzzle velocity and air density which appears on shaft 492. The product, representing the total change in altitude ($z_2$), corresponding to the existing variations in muzzle velocity and air density, is then produced as an angular displacement of output shaft 414.

Figure 15:
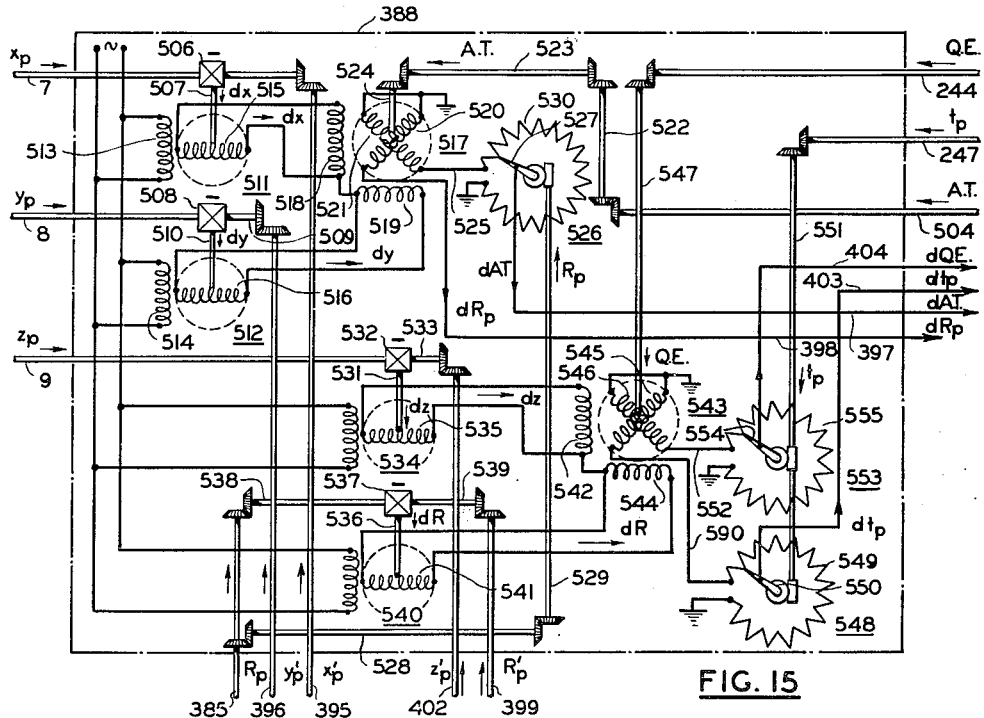
Fig. 15 is a schematic and wiring diagram of the difference indicator and converter of Fig. 1.

Referring now to Fig. 15, the difference indicator and converter 388 will be described. It will be recalled that the function of this apparatus is to detect errors in $x$, $y$, $z$, and $R$ and to transform these errors into proper signal voltages for operating servos 381, 384, 382, and 383. The angular displacement of input shaft 395, representing the $x$ coordinate of the shell burst position ($x'_p$), is subtracted in a differential 506 from the angular displacement of input shaft 7, representing the $x$ coordinate of the computed future target position ($x_p$). Output shaft 507 of differential 506 is thus angularly displaced in accordance with the error ($dx$) between the $x$ coordinates of the shell burst position and the computed future position.

Similarly another differential 508 is provided, having one input member actuated in accordance with ($y_p$) from shaft 8 and another input member actuated in accordance with ($y'_p$) from shaft 396 through shaft 509. This differential operates to obtain the error ($dy$) between the $y$ coordinates of the computed future position and the shell burst position as an angular displacement of output shaft 501.

Rotary transformers 511 and 512 are provided, each having their stator windings 513 and 514 energized from a suitable constant source of alternating potential. Rotor windings 515 and 516 of rotary transformer 511 and 512 are respectively actuated from shafts 507 and 510, in accordance with the $dx$ and $dy$ errors. Rotary transformers 511 and 512 are designed such that the maximum errors ($dx$, $dy$) produce only small angular displacements of windings 515 and 516, respectively. Accordingly, the voltage induced in rotor winding 515 will be proportional to the error ($dx$), and the voltage induced in rotor winding 516 will be proportional to the error ($dy$).

These error voltage signals ($dx$ and $dy$) provide an indication of the errors existing in the output shafts 10 and 384 of angle of train servo 381 and $R_p$ servo 386, respectively. These error voltages could therefore be employed to directly actuate servos 381 and 384 through a suitable quadrant switch which would operate to connect a particular error signal to that one of the servos, actuation of which would be most effective in reducing the particular error signal to zero. If this were done, however, the error signal applied to a particular servo would not be proportional to the amount of the error in the quantity controlled by that servo. Accordingly, it is desired, in order to realize a proportionate type of control, to convert the error signals ($dx$ and $dy$) into corresponding error signals ($dAT$ and $dR_p$) in order to operate the servos 381 and 384, respectively.

The relationship existing between the errors ($dAT$, $dR_p$) and ($dx$, $dy$) may be expressed by the following equations to a high degree of accuracy:

(31) $\quad dR_p = dx \cos A.\ T. + dy \sin A.\ T.$

(32) $\quad d A.\ T. = \dfrac{1}{R_p}(dy \cos A.\ T. - dx \sin A.\ T.)$

The above expressions may be obtained by making the simple assumption that the drift is negligible for these purposes and that therefore angle of train corresponds to the shell burst azimuth angle. Having made this assumption, the above expressions may be derived from a trigonometric analysis of the right triangle having range as one side and azimuth as one of the included angles.

In order to solve Equations 31 and 32, a rotary transformer 517 is provided having two stator windings 518 and 519 respectively, energized from the error voltage signals ($dx$ and $dy$) induced in windings 515 and 516. Windings 518 and 519 of rotary transformer 517 have one common terminal and are arranged to produce magnetic fluxes at right angles to each other. Rotary transformer 517 has two rotor windings 520 and 521 also arranged in spaced quadrature and having a common terminal grounded. The angular displacement of input shaft 504, representing angle of train, is employed through shafts 522, 523, and 524 and the interconnecting gearing to actuate rotor windings 520 and 521 in accordance with angle of train (A. T.). It will be apparent therefore that there will be induced in rotor winding 520 a voltage signal having two components, one equal to $dx$ cos A. T., produced by the magnetic flux of stator winding 518, and another equal to $dy$ sin A. T., produced by the magnetic flux of stator winding 519. Accordingly, the alternating voltage signal appearing on output lead 398, which is electrically connected to the ungrounded terminal of stator winding 520, will be equal to the quantity ($dx$ cos A. T.$+dy$ sin A. T.) and will therefore be proportional to the required error signal ($dR_p$) in accordance with Equation 33.

In a similar manner there is produced on lead 525, which is electrically connected to the ungrounded terminal of winging 521, an alternating potential proportional to the quantity ($dy$ cos A. T.$-dx$ sin A. T.). It will be apparent from Equation 32 that if this quantity is divided by $R_p$ the required angle of train error signal ($d$.A. T.) will be obtained. For this purpose a potentiometer unit 526 is provided having its resistive winding 530 energized from lead 525, in accordance with the parenthetical quantity of Equation 32. A movable contact arm 527 of potentiometer unit 526 is actuated in accordance with ($R_p$) which is obtained from input shaft 385 through shafts 582 and 592, and suitable interconnecting gearing. The resistive winding 530 of potentiometer unit 526 is wound such that there is an inverse relationship between the resistance of the winding at any particular angular displacement and that angular displacement. Accordingly there will be produced upon output lead 397, which is electrically connected to contact arm 527, an alternating voltage signal which is proportional to the energizing voltage, received on lead 525, and inversely proportional to the angular displacement of shaft 529. Accordingly, this alternating voltage signal will be proportional to the quantity $$\frac{1}{R_p}(dy \cos A. T. -dx \sin A. T.)$$

The voltage appearing on output lead 397 is then the proper voltage error signal ($dA$. T.) for operating the angle of train servo 381, in accordance with Equation 32.

The difference indicator and converter also operates to detect errors ($dz$ and $dR$) and to transform these errors into corresponding errors ($dQE$ and $dt_p$) for operating the quadrant elevation and time of flight servos 382 and 383. Thus, the error ($dz$) is obtained as a proportional angular displacement of output shaft 531 of subtracting differential 532, one input member of which is actuated in accordance with $z_p$, received on shaft 9, and the other input member of which is actuated in accordance with $z'_p$, received on shaft 402 through shaft 533. A rotary transformer 534 operates identically with rotary transformers 511 and 512 to produce across the terminals of its rotor winding 535 an alternating potential proportional to the error ($dz$).

In a similar manner, the range error ($dR$) is obtained as an angular displacement of output shaft 536 of a differential 537. One input member of differential 537 is actuated in accordance with $R_p$ from shaft 385 through shaft 538, and a second input member of differential 537 is actuated in accordance with $R'_p$ from shaft 399 through shaft 539. As in the case of the altitude error, a rotary transformer 540 is provided having a rotor winding 541 in which there is induced an alternating potential proportional to the range error ($dR$).

In order to obtain the relationship between the errors ($dR$, $dz$) and the errors ($dQE$ and $dt_p$), the ballistics must be taken into account if any degree of accuracy is to be obtained. It will be recalled that in considering the ballistics the horizontal range ($R'_p$) of the shell burst position was obtained as a function of time of flight and quadrant elevation. Also, the altitude ($z'_p$) of the shell burst position was similarly obtained as a function of time of flight and quadrant elevation. Conversely, it can be said that time of flight is a function of horizontal range and altitude, and we may write the equation relating the changes in these quantities as follows:

(33) $\qquad dt_p = k_1 dz + k_2 dR$

In the above expression, $k_1$ is a ballistic coefficient relating the change in time of flight to a change in altitude, and $k_2$ is a ballistic coefficient relating the change in time of flight to a change in range. The coefficients ($k_1$ and $k_2$) will both depend upon the particular time of flight and quadrant elevation at which we are operating. These coefficients then can be obtained from ballistic tables in terms of the time of flight and quadrant elevation. Having determined these coefficients and substituted them in Equation 33, we obtain the following approximate expression for the error ($dt_p$).

(34) $\quad dt_p = f_1(t_p)[dz \sin (QE-k) + dR \cos (QE-k)]$ wherein $f_1$ represents an arbitrary function of time of flight and $k$ represents an arbitrary constant.

In a similar manner sice quadrant elevation may be expressed as a function of range and altitude, we may write the following expression for the error ($dQE$):

(35) $\qquad dQ. E. = k_3 dR + k_4 dz$ wherein $k_3$ is the ratio of a differential change in quadrant elevation to the differential change in range causing said change in quadrant elevation, and $k_4$ is the ratio of a differential change in quadrant elevation to the differential change in altitude causing said change in quadrant elevation. The coefficients $k_3$ and $k_4$ may also be solved for in terms of time of flight and quadrant elevation from ballistic tables. Having solved for the coefficients $k_3$ and $k_4$ and substituted them in Equation 35, the following approximate expression for the quadrant elevation error ($dQE$) may be obtained:

(36) $\quad dQ. E. = f_2(t_p)[dz \cos (QE-k) - dR \sin (QE-k)]$ wherein $f_2$ represents an arbitrary function of time of flight, and $k$ represents an arbitrary constant.

Equations 35 and 36 are solved in the remaining portion of the difference indicator and converter. The potential induced in rotor winding 535 is connected across one stator winding 542 of a rotary transformer 543, and the potential induced in rotor winding 541 is applied across the terminals of a second stator winding 544 of rotary transformer 543. Stator windings 542 and 544 are arranged in spaced quadrature and have a common terminal connection. Rotary transformer 543 is provided with two rotor windings 545 and 546 also connected in spaced quadrature and having a common terminal connected to ground.

Rotor windings 545 and 546 are actuated from shaft 244, the angular displacement of which represents quadrant elevation, through shaft 547. The zero reference position of the rotor of transformer 543, however, is offset from the zero reference position of input quadrant elevation shaft 244 by an amount equal to the factor ($k$). Thus, rotor windings 545 and 546 will be displaced from their zero reference by an amount equal to the quantity ($QE-k$). Accordingly, there will be produced upon lead 590, which is electrically connected to rotor winding 545, an alternating potential proportional to the quantity $dz \sin (QE-k) + dR \cos (QE-k)$.

It will be seen, by reference to Equation 36, that the potential signal appearing on lead 590 must be multiplied by a function of time of flight in order to obtain the time of flight error ($dt_p$). For this purpose a potentiometer unit 548 is provided having one terminal of its resistive winding 549 connected to lead 590 and the other terminal grounded. Movable contact arm 550 of potentiometer unit 548 is actuated in accordance with time of flight ($t_p$) from input shaft 247 through shaft 551. Resistive winding 549 is wound in accordance with the required function ($f_1$) of time of flight. Accordingly, there will be produced upon output lead 403, which is electrically connected to contact arm 550 the voltage error signal ($dt_p$) in accordance with Equation 34.

In a similar manner, there is induced in rotor winding 546, of rotary transformer 543, an alternating potential proportional to the bracketed expression in Equation 36. This potential is transmitted, as by lead 552, to a potentiometer unit 553 where it is employed to energize the resistive winding 555 of that unit. Movable contact arm 554 of potentiometer unit is actuated in accordance with time of flight from shaft 551, and the resistive winding 555 is wound in accordance with the particular function ($f_2$) of time of flight appearing in Equation 36. Thus, there is produced upon output lead 404, which is electrically connected to contact arm 554, an alternating potential error signal ($dQE$) which is of the proper magnitude to be employed as the input signal to the quadrant elevation servo, in accordance with Equation 36.

It will be understood that the angle of train, quadrant elevation, and time of flight data, represented by the positions of shafts 10, 11, and 13, respectively, of Fig. 1, are sufficient to fully define a shell burst position, and therefore to fully define the coordinates ($x'_p$, $y'_p$, $z_p$) of that position. Therefore, it is not theoretically necessary at all to obtain a horizontal range error signal ($dR_p$) and to employ this signal to actuate the $R_p$ servo 384 to position shafts 386, 387 and 385 in accordance with future horizontal range ($R_p$). This range servo equipment is provided in the actual director merely as one expedient way of obtaining ample operating torque on the various shafts. It would be perfectly possible, however, to completely eliminate the horizontal range servo equipment. If this were done, the shell burst range ($R'_p$), appearing as a proportional displacement of shaft 399, would be employed as the input to rectilinear converter 389 and difference indicator and converter 388 in place of the future horizontal range ($R_p$) which is now received by these converters as a proportional displacement of shaft 385.

The problem of correcting the ballistic fuze, appearing as a proportional angular displacement of shaft 422, for the fuze dead time (F. D. T.), which problem is solved in the fuze converter 423, will now be considered. The ballistic fuze ($f_b$), received on shaft 422, represents the fuze number that would be needed if the projectile were fired instantaneously upon reception of the fuze number. Actually, however, there is a time interval (the fuze dead time) between the reception of the data by the fuze setter and the firing of the projectile. To take care of this dead time it is necessary to compute a correction ($\Delta f_b$) which is equal to the change in the fuze number during the dead time. Essentially then this is a problem of prediction.

For the case of a target flying a constant speed in a constant direction, which condition is most often met in practice, the fuze setting will vary substantially in a parabolic relationship with respect to time. Thus, we may write the following equation for fuze at any time ($t$):

(37) $\qquad F_b = a_0 + a_1 t + a_2 t^2$

The fuze at the dead time interval later may then be expressed as follows:

(38) $\quad F_b = a_0 + a_1(t + \text{F. D. T.}) + a_2(t + \text{F. D. T.})^2$

The change in fuze ($\Delta F_b$) during the dead time interval may then be obtained by subtracting Equation 38 from Equation 37 to get

(39) $\quad \Delta F_b = (a_1 + 2a_2 t)\, \text{F. D. T.} + a_2\, (\text{F. D. T.})^2$ In the above expression it will be apparent that the coefficient ($a_1 + 2a_2 t$) of the F. D. T. term is equal to the first derivative ($\dot{F}_b$) of Equation 37, and the coefficient ($a_2$) of the (F. D. T.)$^2$ term is equal to the second derivative ($\ddot{F}_b$) of Equation 37. Thus we may express the fuze dead time correction ($\Delta F_b$) by the following equation:

(40) $\qquad \Delta F_b = \dot{F}_b \cdot \text{F. D. T.} + \ddot{F}_b \dfrac{(\text{F. D. T.})^2}{2}$ Actually in the fuze converter of Fig. 16 the fuze correction ($\Delta F_b$) is solved for as the sum of two component corrections ($\Delta F_{b_1}$) and ($\Delta F_{b_2}$), which component corrections have the following values:

(41) $\qquad \Delta F_{b_1} = \dot{F}_b \cdot \text{F. D. T.} - \dfrac{1}{k_2} \ddot{F}_b (\text{F. D. T.})^2$

(42) $\qquad \Delta F_{b_2} = \left( \tfrac{1}{2} + \dfrac{1}{k_2} \right) \ddot{F}_b (\text{F. D. T.})^2$ wherein $k_2$ is the same variable speed drive proportionality factor previously defined with respect to the smoothing, differentiating, and predicting circuit of Fig. 5. It will be seen that the sum of $\Delta F_{b_1}$, as given by Equation 41, and $\Delta F_{b_2}$, as given by Equation 42, is equal to the total fuze correction ($\Delta F_b$) as given by Equation 42.

Figure 16:
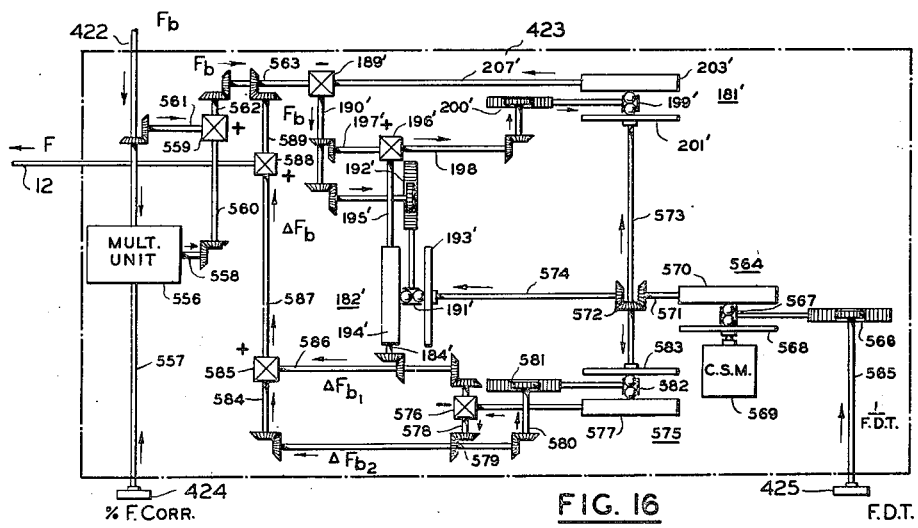
Fig. 16 is a detailed schematic drawing of the fuze corrector of Fig. 1.

Referring now to Fig. 16, ballistic fuze ($F_b$), received as a proportional displacement of input shaft 422, is introduced into a multiplying unit 556 wherein it is multiplied by the percent fuze correction set in on knob 424 and received on shaft 557. The output of multiplying unit 556, appearing as a proportional angular displacement of output shaft 558, represents an arbitrary fuze spot correction, the magnitude of which an operator may control through knob 424. This fuze spot is introduced into a differential 559 by shaft 560. Another input of differential 559 is actuated from input shaft 422 through shaft 561. Thus the output of differential 559, appearing on shafts 562 and 563, represents the ballistic fuze ($F_b$) having been corrected by an arbitrary spot.

Shaft 563 is then employed as the input signal to a smoothing and differentiating circuit including variable speed devices 181', 182', differentials 189', 196' and the associated shafts and gearing. It will be been that this smoothing and differentiating circuit is identical to that employed in the predicting circuit of Fig. 5 for obtaining the $x$ coordinate of the target rate ($\dot{x}_0$) from the input ($x_0$) data, with the following two exceptions:

(1) No loop comparable to the previously referred to additional shaft 206 and differential 205 of Fig. 5 is included.

(2) The discs 201' and 193' of variable speed devices 181' and 182' are driven at a speed inversely proportional to fuze dead time.

It will be recalled that such a smoothing and differentiating circuit operated to produce an angular displacement of output shaft 184', proportional to the rate of angular displacement of the input shaft to the differential 189'. Thus the angular displacement of shaft 184' may be said, in the case of Fig. 16, to be proportional to the rate of change ($\dot{F}_b$) of ballistic fuze. However, the displacement of ball carriage 199' required in order to match the rate of input shaft 563 by the rate of cylinder 203' will be inversely proportional to the speed of disc 201'. Accordingly, the displacement of shaft 184' will also be proportional to the fuze dead time since, as will later be explained, disc 201' is driven at a speed inversely proportional to the fuze dead time. Thus, the angular displacement of shaft 184' will be proportional to the product ($\dot{F}_b \cdot$ F. D. T.).

However, the previous analysis of this smoothing and differentiating circuit assumed that the input shaft was rotating at a constant rate, that is, it had no angular acceleration. In the case of fuze, however, it was previously explained that ordinarily the value of fuze ($F_b$) will be accelerating, and therefore input shaft 563 will have an angular acceleration. It may be shown that the result of this angular acceleration in input shaft 563 will be to cause output shaft 184' to lag the desired measure of the quantity ($\dot{F}_b \cdot$ F. D. T.) by the quantity $$\frac{1}{k_2} \ddot{F}_b\, (\text{F. D. T.})^2$$

wherein $k_2$ is the proportionality factor for variable speed device 182'. Therefore the actual angular displacement of output shaft 184' will be proportional to the quantity $$\left[ \dot{F}_b \cdot \text{F. D. T.} - \frac{1}{k_2} \ddot{F}_b (\text{F. D. T.})^2 \right]$$

and will therefore be proportional to one component ($F_{b_1}$) of the total fuze correction in accordance with Equation 41.

In order to drive disc 201' at a speed inversely proportional to the fuze dead time, a fuze dead time knob 425 is provided. The dial associated with knob 425 is so calibrated that in order to obtain a reading on the dial equal to the fuze dead time, the knob 425 must be rotated an amount inversely proportional to the fuze dead time, that is, an amount proportional to $$\left( \frac{1}{\text{F. D. T.}} \right)$$

This rotation of knob 425 is transmitted to a variable speed device 564 through shaft 565, and rack and pinion arrangement 566, where it is employed to laterally displace the ball carriage 567 from its neutral position by an amount proportional to $$\left(\frac{1}{\text{F.D.T.}}\right)$$

The disc 568 of variable speed device 564 is rotated at a constant speed by the constant speed motor 569. Accordingly, the cylinder 570 will be rotated at a speed proportional to $$\frac{1}{\text{F.D.T.}}$$

The rotation of cylinder 570 is then employed through shaft 571 and gearing 572 to drive shafts 573 and 574 at speeds proportional to $$\frac{1}{\text{F.D.T.}}$$

Shaft 573 actuates disc 201' of variable speed device 181', and shaft 574 actuates disc 193' of variable speed device 182'. The effect of rotating disc 193' at a speed proportional to $$\frac{1}{\text{F.D.T.}}$$

is to maintain the damping characteristics of the smoothing and differentiating circuit constant and independent of the particular fuze dead time set in on knob 425.

The component correction ($\Delta F_{b_1}$), appearing as angular displacement of shaft 184', is differentiated in another differentiating circuit including variable speed device 575 and differential 576. This differentiating circuit is of the ordinary first order type wherein the rotation of the cylinder 577 is subtracted in differential 576 from the displacement of input shaft 184' and the difference, appearing on shafts 578, 579, and 580, is employed through rack and pinion arrangement 581 to displace the ball carriage 582. The disc 583 of variable speed device 575 is also driven at a speed inversely proportional to the fuze dead time from shaft 573. As is well known, this differentiating circuit operates to reach a condition of equilibrium at which the ball carriage 582 is displaced by an amount proportional to the rate of change of input shaft 184', and inversely proportional to the speed of the driving disc 583.

Since the lag existing on shaft 184' is constant for a particular acceleration of input shaft 563, and since the acceleration of shaft 563 will ordinarily be substantially constant, the value of the rate of change of shaft 184' will not be affected by this lag. Thus the rate of change of shaft 184' will be equal to the quantity $[(\dot{F}_b \cdot \text{F.D.T.})]$, which quantity could be obtained by differentiating Equation 41. The displacement of ball carriage 582, being proportional to this quantity and also inversely proportional to the speed of driving disc 583, will be proportional to the product of this quantity by the fuze dead time. Thus ball carriage 582 will be displaced by an amount proportional to the quantity $[\dot{F}_b(\text{F.D.T.})^2]$. The displacement of ball carriage 582 appears as a proportional displacement of shafts 579 and 584, the proportionality factor being so chosen by the design of the interconnecting gearing that the displacement of shaft 579 represents the quantity $$\left(\tfrac{1}{2}+\frac{1}{k_2}\right)\dot{F}_b(\text{F.D.T.})^2$$

Thus the angular displacement of shaft 584 is proportional to the second component ($\Delta F_{b_2}$) of the total fuze correction in accordance with Equation 42.

The first component ($\Delta F_{b_1}$) is introduced into a differential 585 from shaft 184' through shaft 586. The other input of differential 585 is actuated in accordance with the second component ($\Delta F_{b_2}$) from shaft 584. Thus, the output member of differential 585 angularly displaces shaft 587 by an amount proportional to the sum of the two component corrections, and therefore proportional to the total fuze correction ($\Delta F_b$).

The ballistic fuze ($F_b$), appearing on shaft 563, is employed to actuate one input member of a differential 588 through shaft 589. The other input member of this differential is actuated in accordance with the total fuze correction ($\Delta F_b$) from shaft 587. Thus, there is produced an angular displacement of output shaft 12 proportional to the desired fuze setting (F), being equal to the ballistic fuze ($F_b$) corrected for fuze dead time by the quantity ($\Delta F_b$).

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a fire control apparatus for computing a coordinate of shell burst position, a time of flight input shaft, a quadrant elevation input shaft, multiplier means actuated by the respective shafts, an output member for the multiplier means, a three dimension cam operatively connected with the respective shafts for rotation and translation thereby, a pair of differential mechanisms each having an output member and a pair of input members, the output member of one differential mechanism being connected to an input member of the other differential mechanism, a lift pin for the cam, means for operatively connecting the remaining ones of the input members of the differential mechanisms respectively to the output of the multiplier means, the lift pin and time of flight shaft, the arrangement being such that the output member of the last mentioned differential mechanism is constantly displaced in accordance with a coordinate of shell burst position corresponding to the instantaneous displacement of the time of flight and quadrant elevation input shafts.

2. In a fire control apparatus for computing a coordinate of shell burst position, a time of flight input shaft, a quadrant elevation input shaft, multiplier means actuated by the respective shafts, a three dimension cam displaced in rotation and in translation by the respective shafts, a lift pin for the cam, the cam being laid out empirically to displace the lift pin in accordance with a predetermined function of quadrant elevation and time of flight of a predetermined projectile, an output member for the multiplier means, a differential having one input actuated by said output member, a second input for the differential displaced by the lift pin, an output shaft for the differential, a second differential having one input actuated by the output shaft and a second input actuated by the time of flight shaft, an output member for the second differential, the arrangement being such that the last mentioned output member is displaced according to said coordinate.

3. In a fire control apparatus provided with a time of flight shaft and a quadrant elevation shaft, means controlled solely by said shafts for computing a coordinate of shell burst position comprising a multiplier actuated by the respective shafts for computing the product of their displacement, a three dimension cam, a lift pin therefor, means actuated by the respective shafts for displacing the cam in translation and rotation, the cam being laid out empirically to displace the lift pin according to a predetermined function of quadrant elevation and time of flight for a predetermined projectile, an adding differential, an output member for the multiplier, an input member for the differential displaced thereby, a second input for the differential displaced by the lift pin, an output shaft for the differential, a second adding differential having a first input coupled thereto, a second input for the latter differential coupled with the time of flight shaft, an output member for the latter differential, the arrangement being such that the last mentioned output member is displaced automatically in proportion to said coordinate for any instantaneous angular position of the time of flight and quadrant elevation shafts.

4. In a fire control apparatus provided with a time of flight shaft and a quadrant elevation shaft, means controlled solely by said shafts for computing a coordinate of shell burst position comprising a multiplier actuated by the respective shafts, a three dimension cam displaced in rotation and translation by the respective shafts, a lift pin for the cam, a pair of differential mechanisms each having an output member and a pair of input members, the output member of one differential mechanism being connected to an input member of the other differential mechanism, means for operatively connecting the remaining ones of the input members of the differential mechanisms respectively to the output of the multiplier means, the lift pin, and the time of flight shaft, the arrangement being such that the output member of the last mentioned differential mechanism is actuated in accordance with the computed coordinate.

5. In a fire control apparatus provided with a time of flight shaft and a quadrant elevation shaft, means controlled solely by said shafts for computing a range coordinate of shell burst position comprising a multiplier actuated by the respective shafts, a three dimension cam displaced in rotation and translation by the respective shafts, the cam being laid out empirically in accordance with a range function of time of flight and quadrant elevation for a predetermined projectile, a lift pin for the cam, a pair of differential mechanisms each having an output member and a pair of input members, the output member of one differential mechanism being connected to an input member of the other differential mechanism, means for operatively connecting the remaining ones of the input members of the differential mechanisms respectively to the output of the multiplier means, the lift pin, and the time of flight shaft, the arrangement being such that the output member of the last mentioned differential mechanism is actuated in accordance with the computed range coordinate.

6. In a fire control apparatus provided with a time of flight shaft and a quadrant elevation shaft, means controlled solely by said shafts for computing a range coordinate of shell burst position comprising a multiplier actuated by the respective shafts, a three dimension cam displaced in rotation and translation by the respective shafts, the cam being laid out empirically in accordance with a range function of time of flight and quadrant elevation for a predetermined projectile, a lift pin for the cam, a pair of differential mechanisms each having an output member and a pair of input members, the output member of one differential mechanism being connected to an input member of the other differential mechanism, means actuated by the lift pin for driving one of the input members, a pair of independent driving connections each including shafts and gears for connecting the time of flight shaft and the output of the multiplier respectively to the remaining input members of the differential mechanisms, the gears of the respective driving connections serving to multiply the displacement of the asociated input members by a predetermined constant, the arrangement being such that the output member of the last mentioned differential mechanisms is actuated in accordance with the computed range coordinate.

7. In a fire control apparatus provided with a time of flight shaft and a quadrant elevation shaft, means controlled solely by said shafts for computing an altitude coordinate of shell burst position comprising a multiplier actuated by the respective shafts, a three dimension cam displaced in rotation and translation by the respective shafts, the cam being laid out empirically in accordance with an altitude function of time of flight and quadrant elevation for a predetermined projectile, a lift pin for the cam, a pair of differential mechanisms each having an output member and a pair of input members, the output member of one differential mechanism being connected to an input member of the other differential mechanism, means for operatively connecting the remaining ones of the input members of the differential mechanisms respectively to the output of the multiplier means, the lift pin, and the time of flight shaft, the arrangement being such that the output member of the last mentioned differential mechanism is actuated in accordance with the computed altitude coordinate for any instantaneous angular position of the time of flight and quadrant elevation shafts.

8. In a fire control apparatus provided with a time of flight shaft and a quadrant elevation shaft, means controlled solely by said shafts for computing an altitude coordinate of shell burst position comprising a multiplier actuated by the respective shafts, a three dimension cam displaced in rotation and translation by the respective shafts, the cam being laid out empirically in accordance with an altitude function of time of flight and quadrant elevation for a predetermined projectile, a lift pin for the cam, a pair of differential mechanisms each having an output member and a pair of input members, the output member of one differential mechanism being connected to an input member of the other differential mechanism, means actuated by the lift pin for driving one of the input members, a pair of independent driving connections each including shafts and gears for connecting the time of flight shaft and the output of the multiplier respectively to the remaining input members of the differential mechanisms, the gears of the respective driving connections serving to multiply the displacement of the associated input members by a predetermined constant, the arrangement being such that the output member of the last mentioned differential mechanism is actuated in accordance with the computed altitude coordinate.

9. In a fire control apparatus, a primary ballistic apparatus for computing a coordinate of shell burst position for predetermined standard atmospheric and muzzle velocity conditions, a time of flight input shaft, a quadrant elevation input shaft, multiplier means actuated by the respective shafts for obtaining the product of the displacement thereof, an output for the multiplier means, a three dimension cam laid out according to a function of quadrant elevation and time of flight, means for displacing the cam in rotation and translation by the respective shafts, a pair of differential mechanisms each having an output member and a pair of input members, the output member of one differential mechanism being connected operatively to an input member of the other differential mechanism a lift pin for the cam, means for operatively connecting the remaining ones of the input members of the differential mechanisms respectively to the output of the multiplier means, the lift pin, and the time of flight shaft, the output member of the last mentioned differential mechanism being actuated according to the computed coordinate for standard conditions, a differential mechanism having one input member actuated by the last mentioned member, a second input member and an output member therefor, a secondary ballistic computing device operatively connected to said second input member for correcting the displacement of the last mentioned output member for muzzle velocity and atmospheric conditions differing from said standard conditions the secondary ballistic computing device comprising a second three-dimensional cam, means to actuate said cam in fixed relation to the cam of the primary ballistic apparatus, multiplying means having one input actuated by the output of the second three-dimensional cam and a second input actuated in accordance with present muzzle velocity and atmospheric conditions, and means to connect the output of the multiplying means to the second input means of the last-recited differential mechanism.

10. In a fire control apparatus, a primary ballistic apparatus for computing a coordinate of shell burst position for predetermined standard atmospheric and muzzle velocity conditions, a time of flight input shaft, a quadrant elevation input shaft, multiplier means actuated by the respective shafts, an output member for the multiplier means, a three dimension cam operatively connected with the respective shafts for rotation and translation thereby, a pair of differential mechanisms each having an output member and a pair of input members, the output member of one differential mechanism being connected to an input member of the other differential mechanism, a lift pin for the cam, means for operatively connecting the remaining ones of the input members of the differential mechanisms respectively to the output of the multiplier means, the lift pin and time of flight shaft, the arrangement being such that the output member of the last mentioned differential mechanism is constantly displaced in accordance with a coordinate of shell burst position corresponding to the instantaneous displacement of the time of flight and quadrant elevation input shafts, secondary ballistic means for correcting the displacement of the last mentioned output member for muzzle velocity and atmospheric conditions differing from said standard conditions including three dimension cam means, means for actuating the cam means in translation and rotation in fixed relation with the first mentioned cam, multiplying means, manually operable means for adjusting the multiplying means in accordance with preesnt muzzle velocity and atmospheric conditions when different from said standard conditions, and differential means jointly actuated by the last mentioned output member, the cam means, and the multiplying means for combining the corrections of the second ballistic means with the coordinate computed by the primary ballistic apparatus.

11. In a fire control apparatus, a primary ballistic apparatus for computing a coordinate of shell burst position for predetermined standard atmospheric and muzzle velocity conditions, a time of flight input shaft, a quadrant elevation input shaft, multiplier means actuated by the respective shafts, a three dimension cam displaced in rotation and in translation by the respective shafts, a lift pin for the cam, the cam being laid out empirically to displace the lift pin in accordance with a predetermined function of quadrant elevation and time of flight of a predetermined projectile, an output member for the multiplier means, a differential having one input actuated by said output member, a second input for the differential displaced by the lift pin, an output shaft for the differential, a second differential having one input actuated by the output shaft and a second input actuated by the time of flight shaft, an output member for the second differential, the arrangement being such that the last mentioned output member is displaced according to said coordinate, secondary ballistic computing apparatus for computing corrections for said coordinate for muzzle velocity and atmospheric conditions differing from said standard conditions, the secondary ballistic computing apparatus comprising a three-dimensional cam and two multiplying means, means to actuate the three-dimensional cam in fixed relation to the three-dimensional cam of the primary ballistic apparatus, one of said multipliers having one input actuated by the output of the second three-dimensional cam and its other input actuated in accordance with present atmospheric conditions, the other multiplier having one input actuated by the output of the primary ballistic apparatus and its other input actuated in accordance with present muzzle velocity, differential means to combine the outputs of said multipliers, and differential means to combine the outputs of the primary and secondary ballistic computing apparatus.

12. In a fire control apparatus provided with a time of flight shaft and a quadrant elevation shaft, a primary ballistic apparatus controlled solely by the shafts for computing a coordinate of shell burst position for predetermined standard atmospheric and muzzle velocity conditions, comprising a multiplier actuated by the respective shafts, a three dimension cam laid out empirically in accordance with a predetermined function of quadrant elevation and time of flight for a predetermined projectile, means actuated by the respective shafts for displacing the cam in translation and rotation, a lift pin for the cam, an adding differential, an output member for the multiplier, an input member for the differential displaced thereby, a second input for the differential displaced by the lift pin, an output shaft for the differential, a second adding differential having a first input coupled thereto, a second input for the latter differential coupled with the time of flight shaft, an output member for the latter differential, the arrangement being such that the last mentioned output member is displaced automatically in proportion to said coordinate for any instantaneous angular position of the time of flight and quadrant elevation shafts, a secondary ballistic apparatus including means manually adjustable according to present air density and muzzle velocity, cooperating cam means actuated from the time of flight and quadrant elevation shafts in fixed relation with the first-mentioned cam, a first multiplying means to multiply the output of the cam means by a function of air density, a second multiplying means to multiply the output of the primary ballistic apparatus by a function of muzzle velocity, and means to combine the outputs of the multiplying means of the secondary ballistic apparatus with the output of the primary ballistic apparatus.

13. In a fire control apparatus provided with a time of flight shaft and a quadrant elevation shaft, a primary ballistic apparatus controlled solely by the shafts for computing a coordinate of shell burst position for predetermined standard atmospheric and muzzle velocity conditions, comprising a multiplier actuated by the respective shafts, a three dimension cam displaced in rotation and translation by the respective shafts, a lift pin for the cam, a pair of differential mechanisms each having an output member and a pair of input members, the output member of one differential mechanism being connected to an input member of the other differential mechanism, means for operatively connecting the remaining ones of the input members of the differential mechanisms respectively to the output of the multiplier means, the lift pin, and the time of flight shaft, the arrangement being such that the output member of the last mentioned differential mechanism is actuated in accordance with the computed coordinate, secondary ballistic means for correcting the displacement of the last mentioned output member for muzzle velocity and atmospheric conditions differing from said standard conditions including three dimension cam means, means for actuating the cam means in translation and rotation in fixed relation with the first mentioned cam, multiplying means, manually operable means for adjusting the multiplying means in accordance with present muzzle velocity and atmospheric conditions when different from said standard conditions, and differential means jointly actuated by the last mentioned output member, the cam means, and the multiplying means for combining the corrections of the second ballistic means with the coordinate computed by the primary ballistic apparatus.

14. In a fire control apparatus provided with a time of flight shaft and a quadrant elevation shaft, a primary ballistic apparatus controlled solely by the shafts for computing a range coordinate of shell burst position for predetermined standard atmospheric and muzzle velocity conditions, comprising a multiplier actuated by the respective shafts, a three dimension cam displaced in rotation and translation by the respective shafts, the cam being laid out empirically in accordance with a range function of time of flight and quadrant elevation for a predetermined projectile, a lift pin for the cam, a pair of differential mechanisms each having an output member and a pair of input members, the output member of one differential mechanism being connected to an input member of the other differential mechanism, means for operatively connecting the remaining ones of the input members of the differential mechanisms respectively to the output of the multiplier means, the lift pin, and the time of flight shaft, the arrangement being such that the output member of the last mentioned differential mechanism is actuated in accordance with the computed range coordinate, secondary ballistic apparatus including means manually adjustable according to present air density and muzzle velocity, cooperating cam means actuated from the time of flight and quadrant elevation shafts in fixed relation with the first mentioned cam, and means controlled by the last two means to modify the displacement of the last-mentioned output member.

15. In a fire control apparatus provided with a time of flight shaft and a quadrant elevation shaft, a primary ballistic apparatus controlled solely by the shafts for computing a range coordinate of shell burst position under predetermined standard atmospheric and muzzle velocity conditions, comprising a multiplier actuated by the respective shafts, a three dimension cam displaced in rotation and translation by the respective shafts, the cam being laid out empirically in accordance with a range function of time of flight and quadrant elevation for a predetermined projectile, a lift pin for the cam, a pair of differential mechanisms each having an output member and a pair of input members, the output member of one differential mechanism being connected to an input member of the other differential mechanism, means actuated by the lift pin for driving one of the input members, a pair of independent driving connections each including shafts and gears for connecting the time of flight shaft and the output of the multiplier respectively to the remaining input members of the differential mechanisms, the gears of the respective driving connections serving to multiply the displacement of the associated input members by a predetermined constant, the arrangement being such that the output member of the last mentioned differential mechanism is actuated in accordance with the computed range coordinate, secondary ballistic apparatus including means manually adjustable according to present air density and muzzle velocity, cooperating cam means actuated from the time of flight and quadrant elevation shafts in fixed relation with the first mentioned cam, and means jointly controlled by both of the last mentioned means for modifying the displacement of the last mentioned output member.

16. In a fire control apparatus provided with a time of flight shaft and a quadrant elevation shaft, a primary ballistic apparatus controlled solely by the shafts for computing an altitude coordinate of shell burst position for predetermined standard atmospheric and muzzle velocity conditions, comprising a multiplier actuated by the respective shafts, a three dimension cam displaced in rotation and translation by the respective shafts, the cam being laid out empirically in accordance with an altitude function of time of flight and quadrant elevation for a predetermined projectile, a lift pin for the cam, a pair of differential mechanisms each having an output member and a pair of input members, the output member of one differential mechanism being connected to an input member of the other differential mechanism, means for operatively connecting the remaining ones of the input members of the differential mechanisms respectively to the output of the multiplier means, the lift pin, and the time of flight shaft, the arrangement being such that the output member of the last mentioned differential mechanism is actuated in accordance with the computed altitude coordinate for any instantaneous angular position of the time of flight and quadrant elevation shafts, secondary ballistic means for correcting the displacement of the last mentioned output member for muzzle velocity and atmospheric conditions differing from said standard conditions including three dimension cam means, means for actuating the cam means in translation and rotation in fixed relation with the first mentioned cam, multiplying means, manually operable means for adjusting the multiplying means in accordance with present muzzle velocity and atmospheric conditions when different from said standard conditions, and differential means jointly actuated by the last mentioned output member, the cam means, and the multiplying means for combining the corrections of the second ballistic means with the altitude coordinate computed by the primary ballistic apparatus.

17. In a fire control apparatus provided with a time of flight shaft and a quadrant elevation shaft, a primary ballistic apparatus controlled solely by the shafts for computing an altitude coordinate of shell burst position for predetermined standard atmospheric and muzzle velocity conditions, comprising a multiplier actuated by the respective shafts, a three dimension cam displaced in rotation and translation by the respective shafts, the cam being laid out empirically in accordance with an altitude function of time of flight and quadrant elevation for a predetermined projectile, a lift pin for the cam, a pair of differential mechanisms each having an output member and a pair of input members, the output member of one differential mechanism being connected to an input member of the other differential mechanism, means actuated by the lift pin for driving one of the input members, a pair of independent driving connections each including shafts and gears for connecting the time of flight shaft and the output of the multiplier respectively to the remaining input members of the differential mechanisms, the gears of the respective driving connections serving to multiply the displacement of the associated input members by a predetermined constant, the arrangement being such that the output member of the last mentioned differential mechanism is actuated in accordance with the computed altitude coordinate, secondary ballistic apparatus including means manually adjustable according to present air density and muzzle velocity, cooperating cam means actuated from the time of flight and quadrant elevation shafts in fixed relation with the first mentioned cam, and means controlled by the last two means for modifying the displacement of the last mentioned output member.

References Cited in the file of this patent

UNITED STATES PATENTS

| Number | Name | Date |
| --- | --- | --- |
| Re. 16,734 | Schneider | Sept. 6, 1927 |
| 1,813,534 | Ford | July 7, 1931 |
| 1,923,082 | Ely | Aug. 22, 1933 |
| 1,938,825 | Ford | Dec. 12, 1933 |
| 1,943,397 | Riberolles | Jan. 16, 1934 |
| 1,951,852 | Van Den Bergh | Mar. 20, 1934 |
| 2,027,926 | Myers et al. | Jan. 14, 1936 |
| 2,065,303 | Chafee et al. | Dec. 22, 1936 |
| 2,235,826 | Chafee et al. | Mar. 25, 1941 |
| 2,340,350 | Svoboda | Feb. 1, 1944 |
| 2,340,865 | Chafee et al. | Feb. 8, 1944 |
| 2,397,783 | Ford | Apr. 2, 1946 |